(12) United States Patent
Higgins

(10) Patent No.: US 10,501,878 B2
(45) Date of Patent: *Dec. 10, 2019

(54) FLOOR COVERING WITH UNIVERSAL BACKING AND METHODS OF MAKING AND RECYCLING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,866

(22) Filed: Sep. 12, 2018

(65) Prior Publication Data

US 2019/0010646 A1 Jan. 10, 2019

Related U.S. Application Data

(63) Continuation-in-part of application No. 15/879,520, filed on Jan. 25, 2018, now Pat. No. 10,132,019, (Continued)

(51) Int. Cl.
*D05C 17/02* (2006.01)
*B32B 37/12* (2006.01)
(Continued)

(52) U.S. Cl.
CPC .......... *D05C 17/02* (2013.01); *A47G 27/02* (2013.01); *A47G 27/0212* (2013.01);
(Continued)

(58) Field of Classification Search
CPC ............. A47G 27/02; A47G 27/0212; A47G 27/0243; A47G 27/025; A47G 27/0281;
(Continued)

(56) References Cited

U.S. PATENT DOCUMENTS 3,669,779 A 6/1972 Gordon
3,684,600 A 8/1972 Smedberg
(Continued)

FOREIGN PATENT DOCUMENTS

EP 0372105 A1 6/1990
GB 1220387 A 1/1971
(Continued)

*Primary Examiner* — Michael A Tolin
(74) *Attorney, Agent, or Firm* — Hammer & Associates, P.C.

(57) ABSTRACT

A dimensionally stable universal floor covering includes a tufted textile having stitches and a reinforcement layer of fibers and adhesive providing dimensional stability for the entire floor covering. The fibers and adhesive are mixed and then moved by an applicator towards the stitches. A slip path is formed to improve the movement of the fibers and adhesive. A releasable adhesive or gecko-like cover system is provided which also provides additional strength and stability and a releasable attachment of the universal floor covering to a supporting surface.

11 Claims, 16 Drawing Sheets

Related U.S. Application Data which is a continuation-in-part of application No. 15/607,789, filed on May 30, 2017, now Pat. No. 9,924,820, which is a continuation-in-part of application No. 15/372,465, filed on Dec. 8, 2016, now Pat. No. 9,775,457, which is a continuation-in-part of application No. 15/155,348, filed on May 16, 2016, now Pat. No. 9,681,768, which is a continuation-in-part of application No. 15/098,509, filed on Apr. 14, 2016, now Pat. No. 9,506,175, which is a continuation of application No. 14/090,190, filed on Nov. 26, 2013, now Pat. No. 9,339,136.

(60) Provisional application No. 61/797,496, filed on Dec. 10, 2012.

(51) Int. Cl.

| | | |
|---|---|---|
| *A47G 27/02* | (2006.01) | |
| *B05D 1/42* | (2006.01) | |
| *B05C 3/18* | (2006.01) | |
| *B32B 7/12* | (2006.01) | |
| *B32B 5/06* | (2006.01) | |
| *B32B 7/08* | (2019.01) | |
| *C09J 123/08* | (2006.01) | |
| *C09J 127/06* | (2006.01) | |
| *D06N 7/00* | (2006.01) | |
| *B32B 5/26* | (2006.01) | |
| *A47G 27/04* | (2006.01) | |
| *C09J 167/00* | (2006.01) | |
| *C09J 103/00* | (2006.01) | |
| *C09J 129/04* | (2006.01) | |
| *B05C 11/02* | (2006.01) | |
| *B32B 37/10* | (2006.01) | |
| *B32B 37/14* | (2006.01) | |
| *B32B 38/00* | (2006.01) | |
| *B32B 37/24* | (2006.01) | |

(52) U.S. Cl.
CPC ..... *A47G 27/0281* (2013.01); *A47G 27/0462* (2013.01); *B05C 3/18* (2013.01); *B05C 11/023* (2013.01); *B05D 1/42* (2013.01); *B32B 5/06* (2013.01); *B32B 5/26* (2013.01); *B32B 7/08* (2013.01); *B32B 7/12* (2013.01); *B32B 37/10* (2013.01); *B32B 37/1284* (2013.01); *C09J 103/00* (2013.01); *C09J 123/0853* (2013.01); *C09J 127/06* (2013.01); *C09J 129/04* (2013.01); *C09J 167/00* (2013.01); *D06N 7/0065* (2013.01); *D06N 7/0071* (2013.01); *D06N 7/0073* (2013.01); *D06N 7/0076* (2013.01); *D06N 7/0078* (2013.01); *D06N 7/0081* (2013.01); *B29C 2793/0054* (2013.01); *B32B 38/0004* (2013.01); *B32B 2037/148* (2013.01); *B32B 2037/243* (2013.01); *B32B 2038/0072* (2013.01); *B32B 2255/02* (2013.01); *B32B 2255/26* (2013.01); *B32B 2262/101* (2013.01); *B32B 2305/188* (2013.01); *B32B 2307/734* (2013.01); *B32B 2471/02* (2013.01); *C09J 2201/626* (2013.01); *C09J 2205/302* (2013.01); *D06N 2205/14* (2013.01); *D06N 2209/1621* (2013.01); *D06N 2209/1628* (2013.01); *D06N 2213/065* (2013.01); *D06N 2213/068* (2013.01); *D10B 2101/06* (2013.01); *D10B 2503/042* (2013.01); *Y10T 156/10* (2015.01); *Y10T 156/1111* (2015.01); *Y10T 428/23986* (2015.04); *Y10T 428/23993* (2015.04)

(58) Field of Classification Search
CPC ........ A47G 27/0293; B05C 1/04; B05C 1/08; B05C 1/0804; B05C 1/0808; B05C 1/0813; B05C 1/0826; B05C 1/0869; B05C 1/14; B05C 3/18; B05C 11/023; B05C 11/025; B05C 11/026; B05C 11/028; B05D 1/40; B05D 1/42; B29C 2793/0054; B32B 27/12; B32B 37/1018; B32B 37/1284; B32B 37/24; B32B 2037/148; B32B 2037/243; B32B 38/0004; B32B 38/10; B32B 2038/0072; B32B 43/003; B32B 2307/734; B32B 2471/02; C09J 103/00; C09J 129/04; C09J 167/00; C09J 2201/626; C09J 2205/302; D05C 17/02; D06N 7/0071; D06N 7/0073; D06N 7/0076; D06N 7/0078; D06N 7/0081; D06N 2205/14; D06N 2209/1607; D06N 2209/1621; D06N 2213/03; D06N 2213/065; D06N 2213/068; D10B 2503/041; D10B 2503/042; Y10T 156/1111; Y10T 428/23986; Y10T 428/23993
See application file for complete search history.

(56) References Cited

U.S. PATENT DOCUMENTS

| | | | |
|---|---|---|---|
| 4,978,402 A | 12/1990 | Hallworth | |
| 6,428,873 B1 | 8/2002 | Kerr | |
| 7,351,465 B2 | 4/2008 | Jerdee et al. | |
| 7,638,008 B2 | 12/2009 | Hamrick | |
| 7,803,446 B2 | 9/2010 | Martz | |
| 10,132,019 B2* | 11/2018 | Higgins | A47G 27/02 |
| 2002/0039636 A1 | 4/2002 | Fink et al. | |
| 2004/0079467 A1 | 4/2004 | Brumbelow et al. | |
| 2004/0197522 A1 | 10/2004 | Reisdorf et al. | |
| 2005/0037175 A1 | 2/2005 | Loyd et al. | |
| 2007/0224420 A1 | 9/2007 | Despins | |
| 2008/0274307 A1 | 11/2008 | Chereau | |
| 2010/0170991 A1 | 7/2010 | Hobbs et al. | |
| 2011/0039056 A1 | 2/2011 | Mantle et al. | |
| 2012/0009377 A1 | 1/2012 | Dodge, III | |
| 2014/0158276 A1 | 6/2014 | Higgins | |
| 2015/0299947 A1 | 10/2015 | Brumbelow | |
| 2016/0230324 A1 | 8/2016 | Higgins | |
| 2016/0255976 A1* | 9/2016 | Higgins | B05D 1/40 |

FOREIGN PATENT DOCUMENTS

| | | |
|---|---|---|
| JP | 06-343542 A | 12/1994 |
| KR | 10-212-0139728 A | 12/2012 |
| WO | WO 94/02678 A1 | 2/1994 |

* cited by examiner

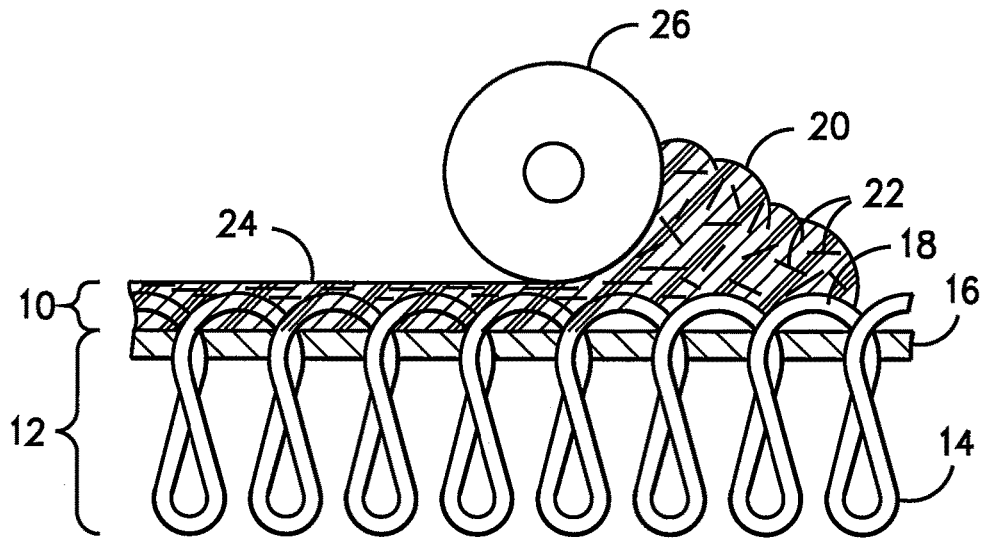
FIG. -1-
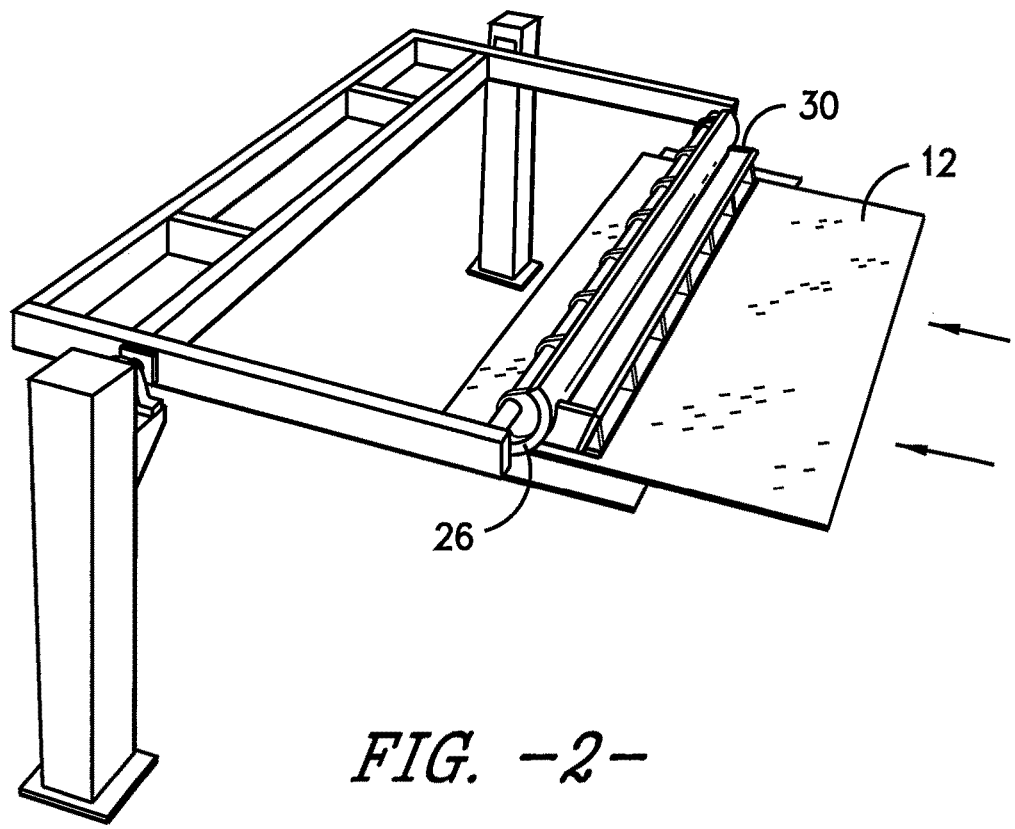
FIG. -2-

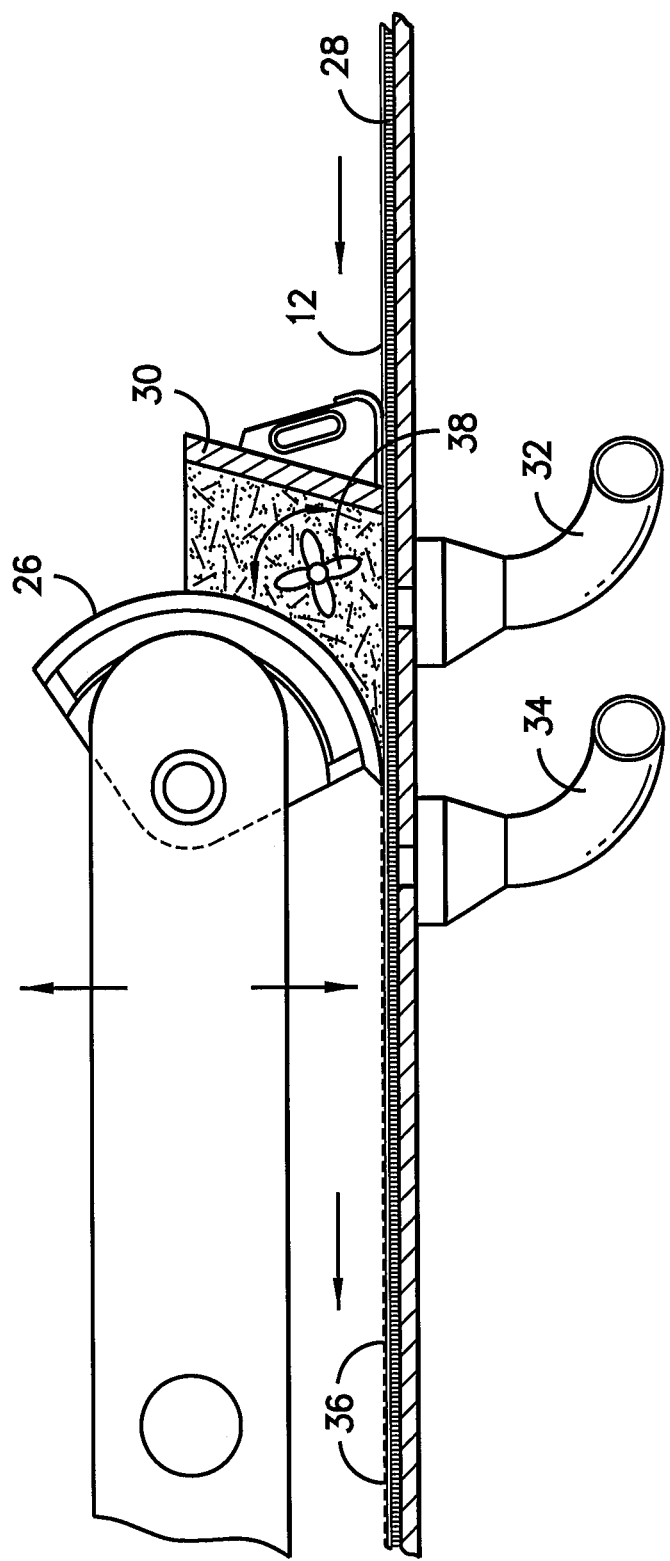
FIG. -3-

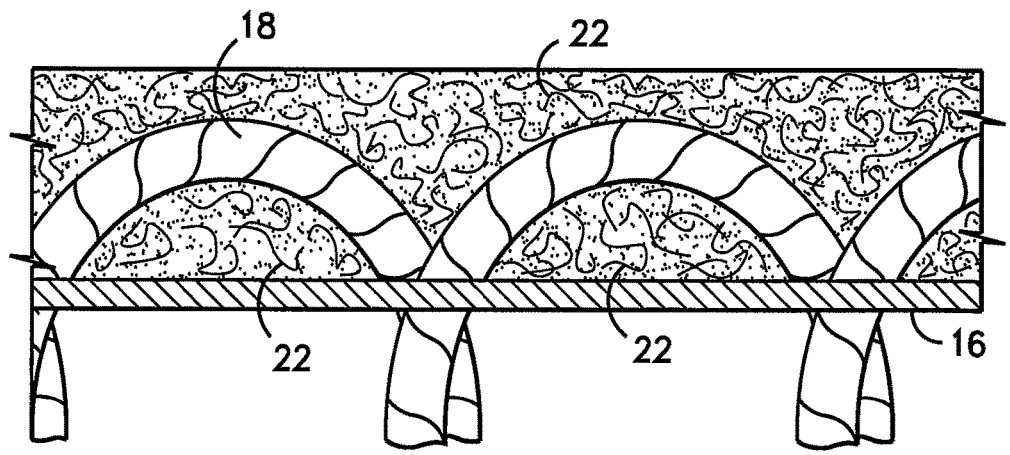
FIG. -3A-
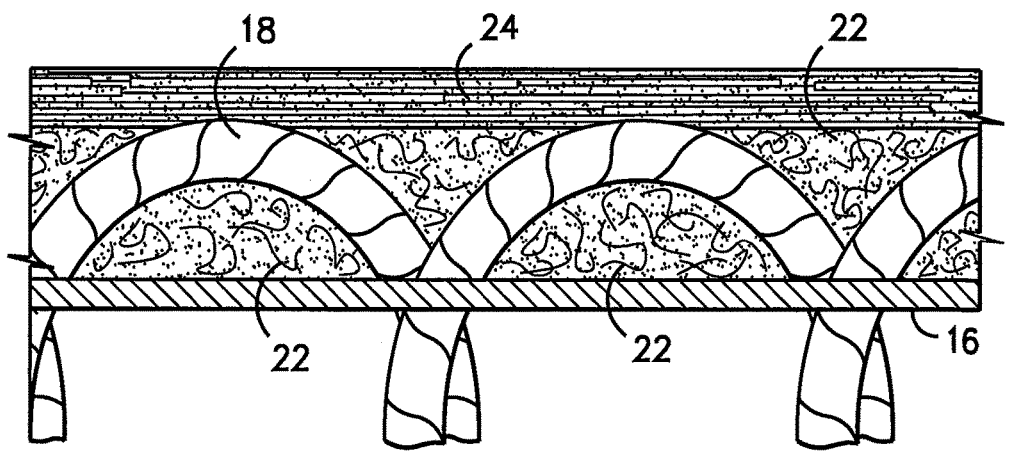
FIG. -3B-

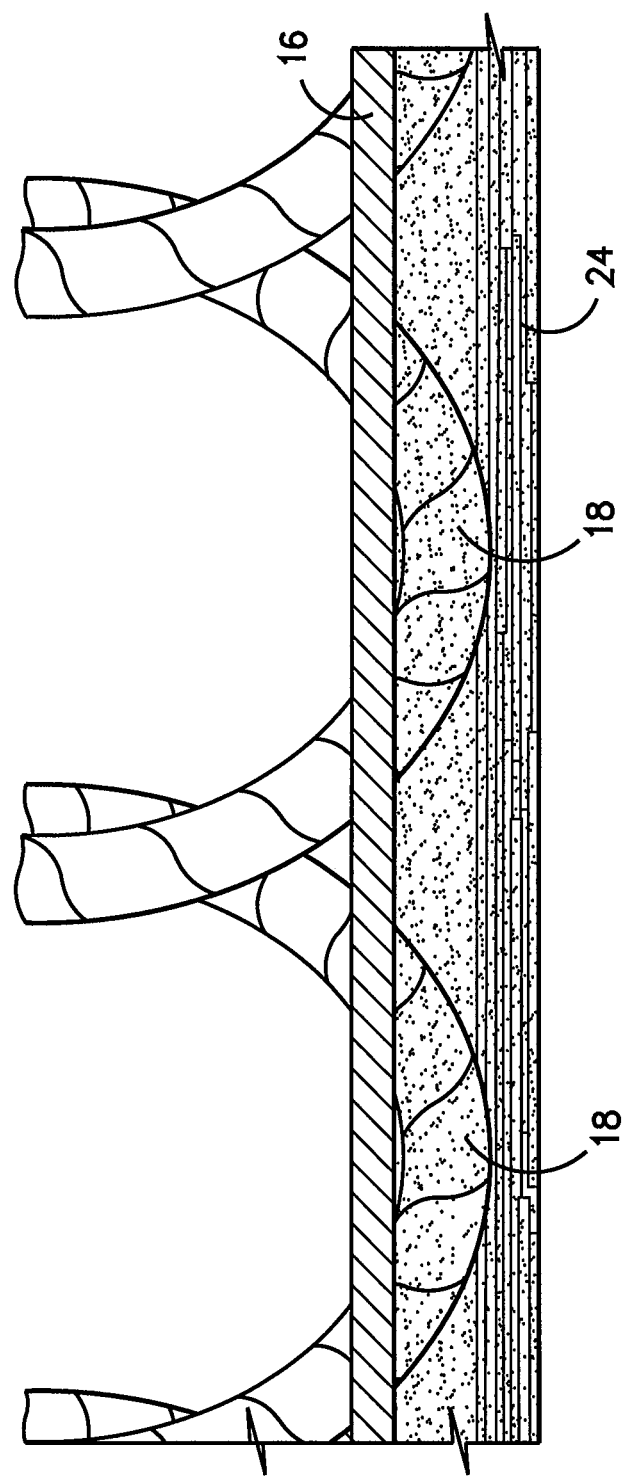
FIG. -4A-

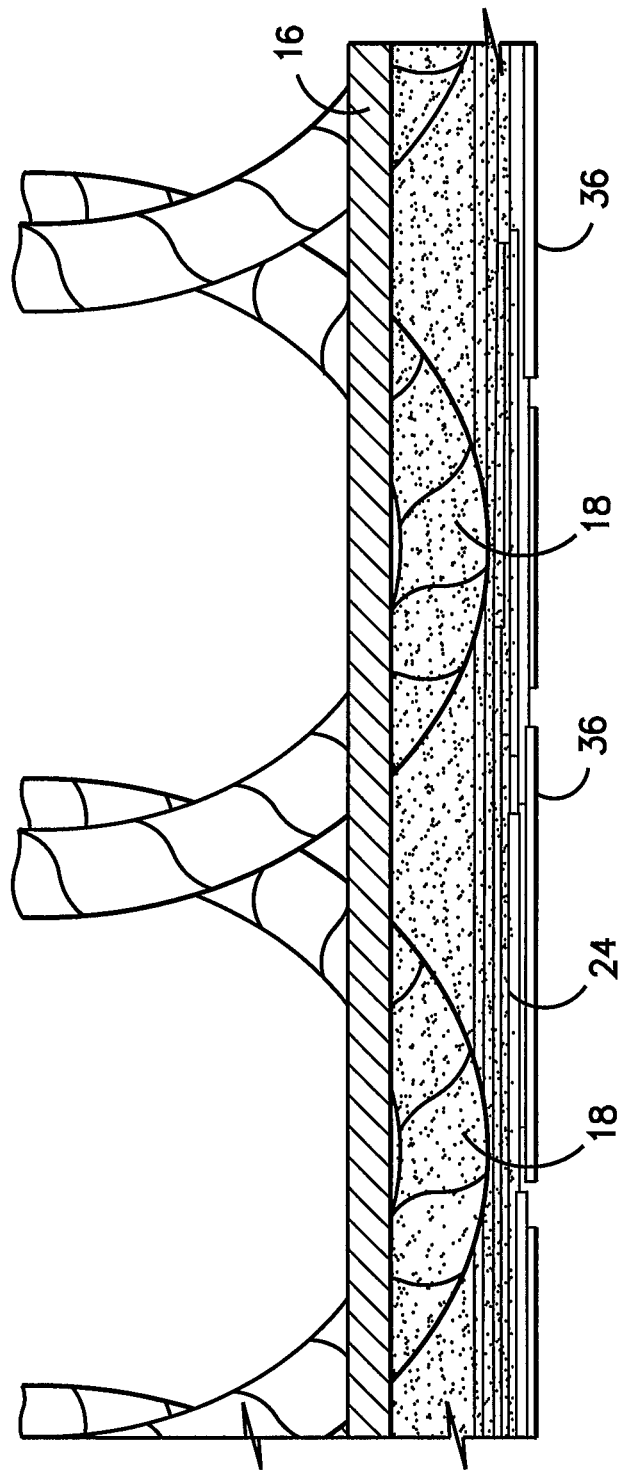
FIG. -4B-

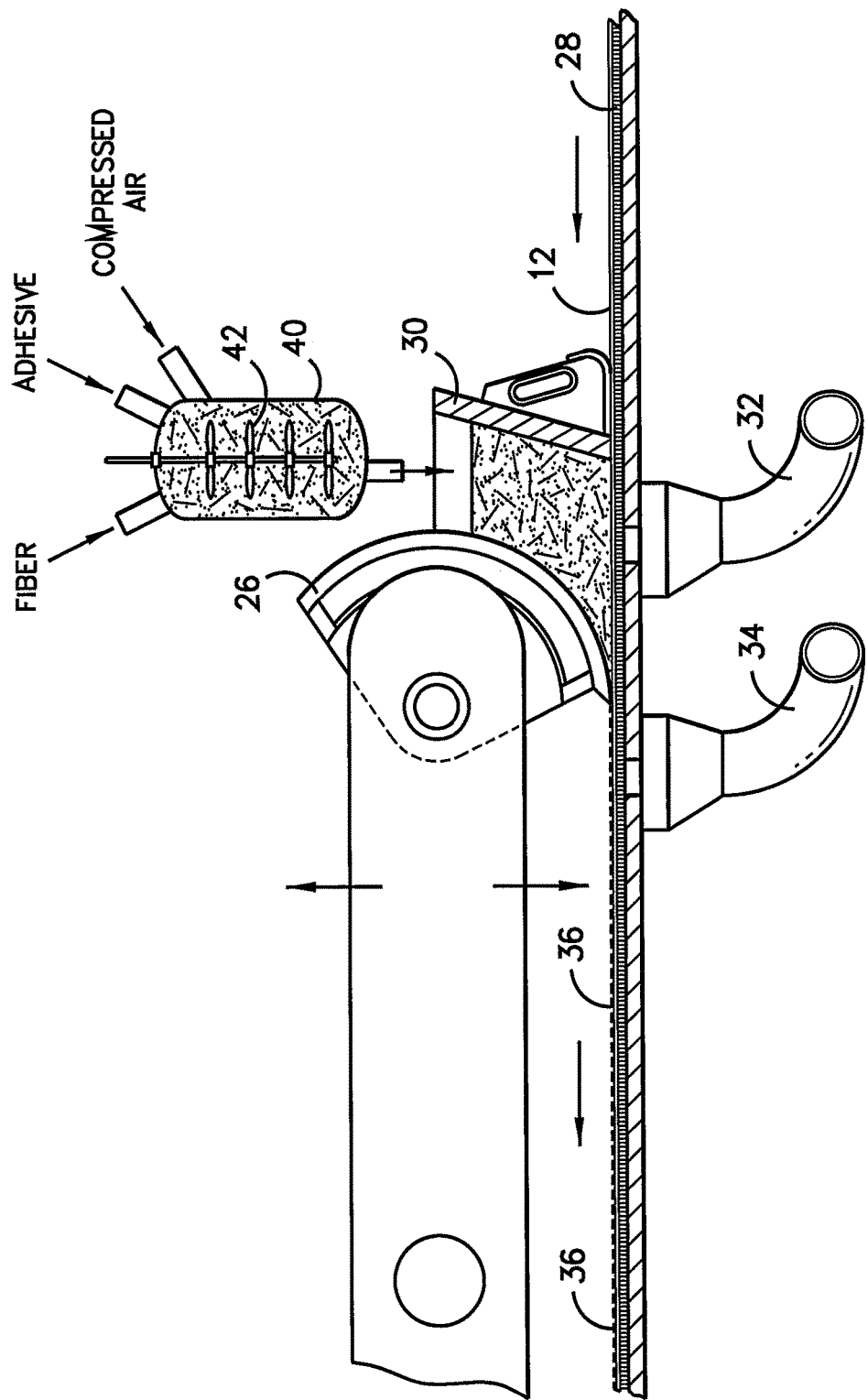
FIG. -5-

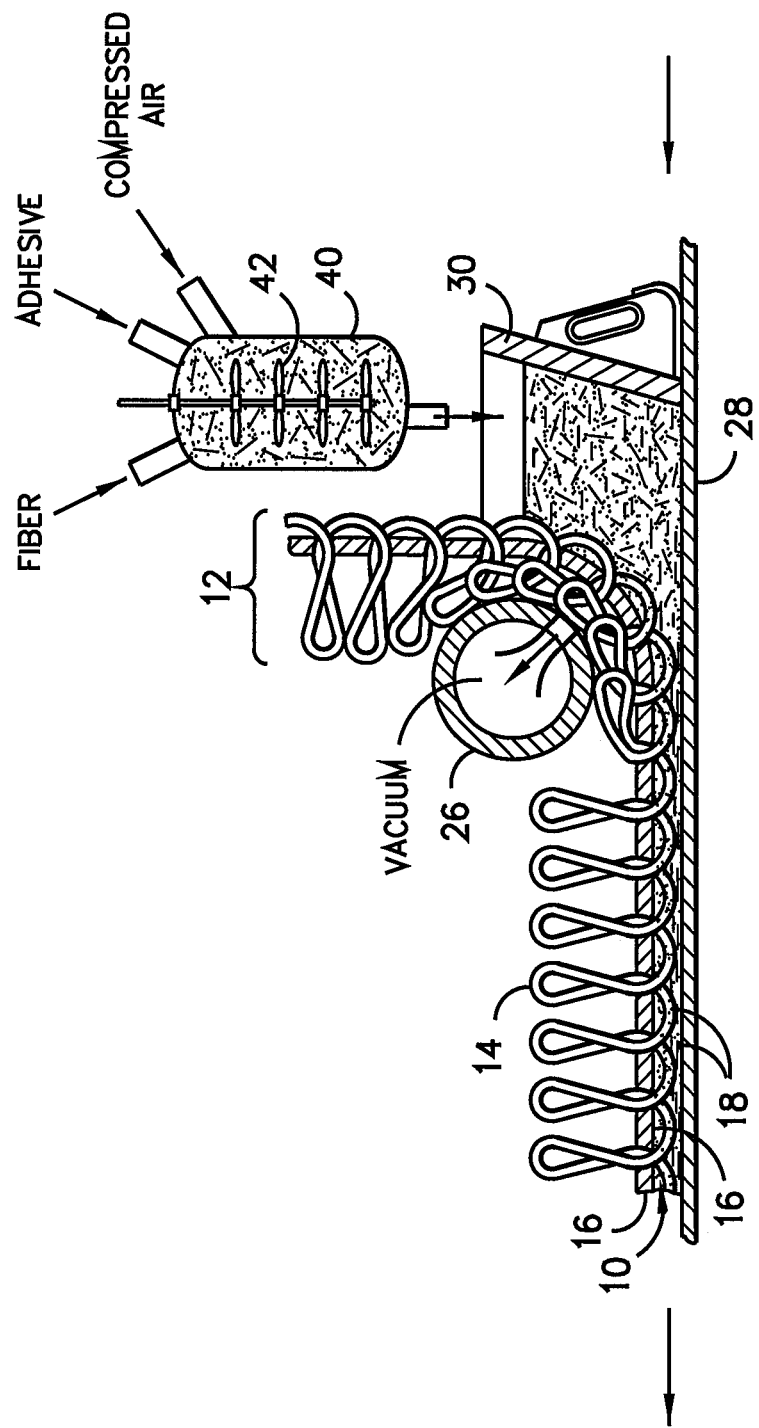
FIG. -6-

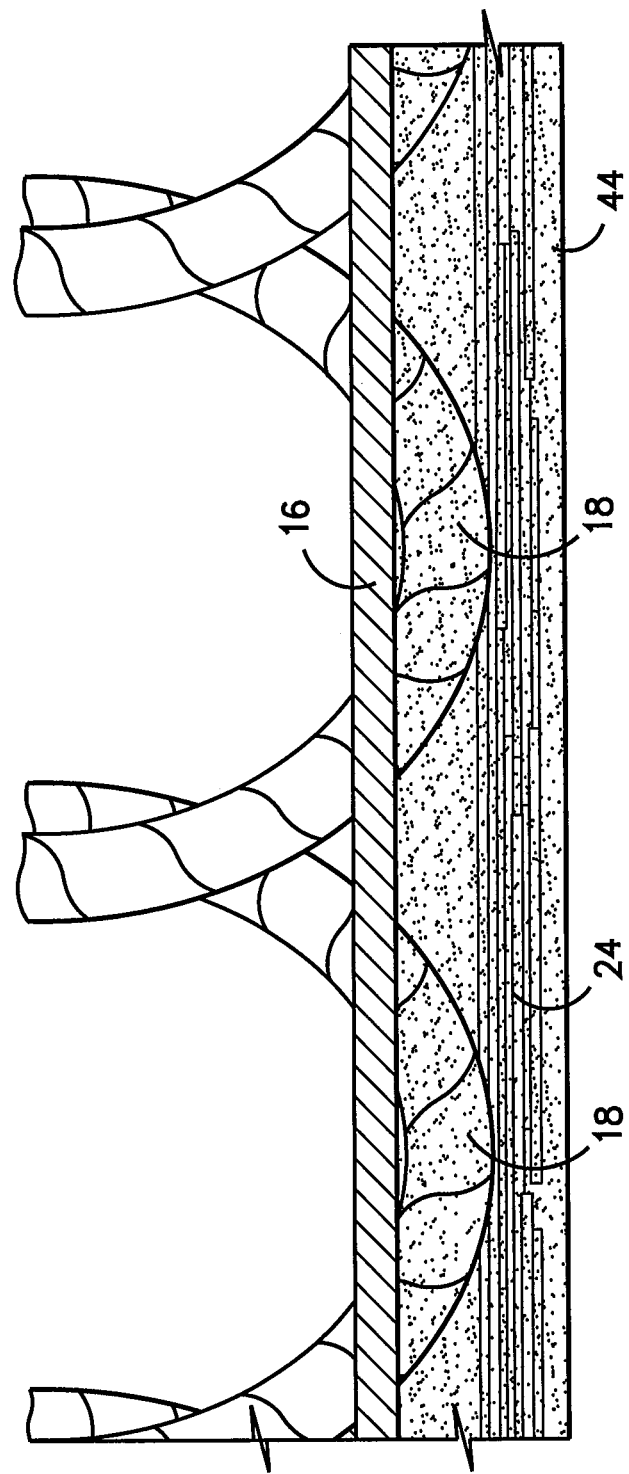
FIG. -6A-

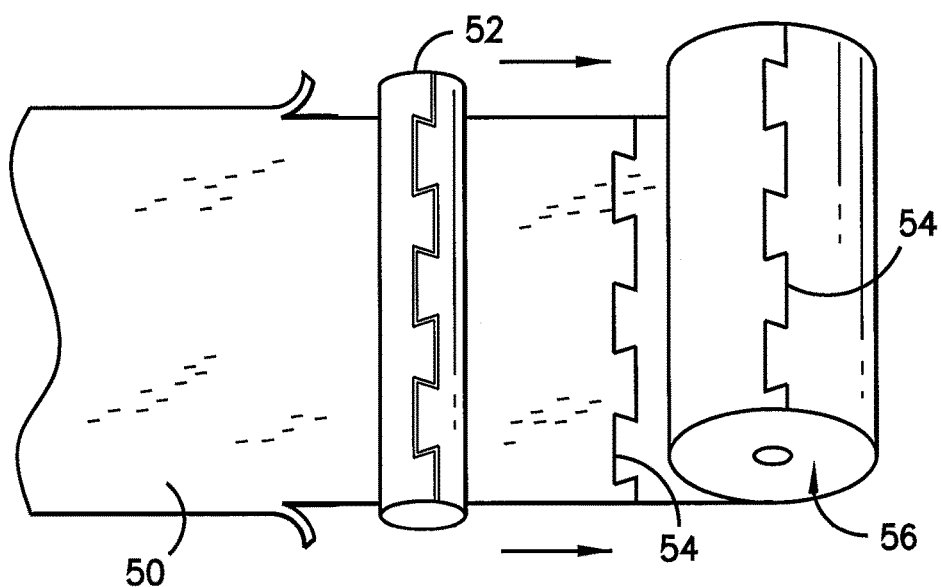
FIG. -7-

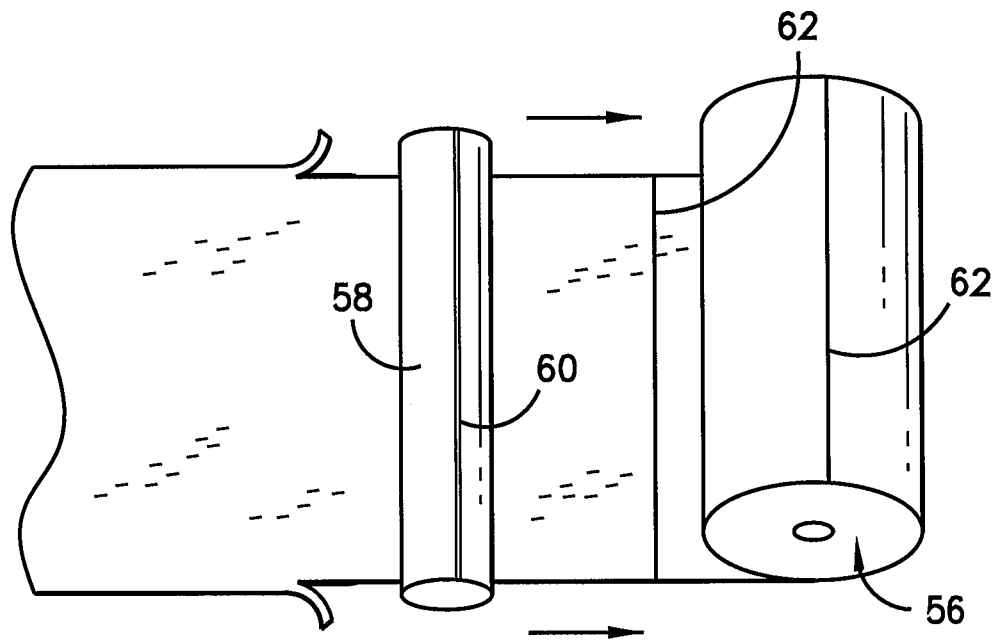
FIG. -8A-
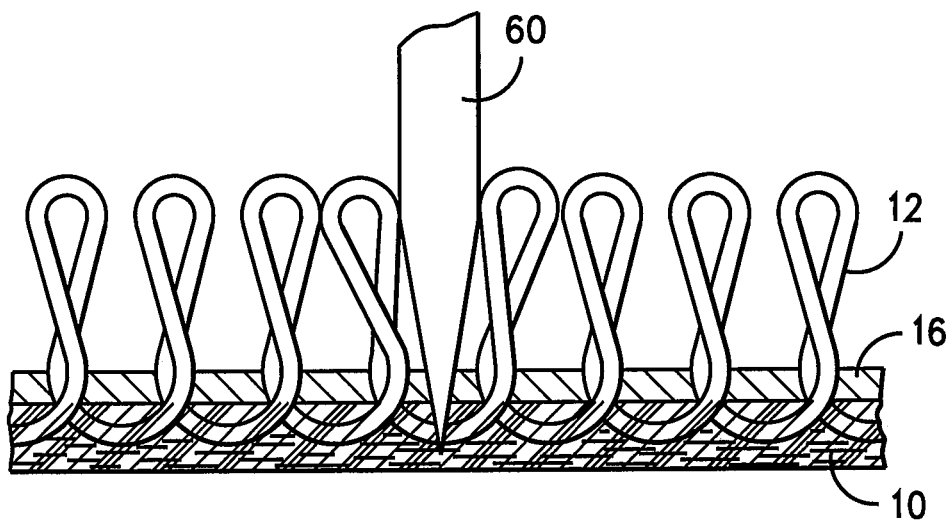
FIG. -8B-

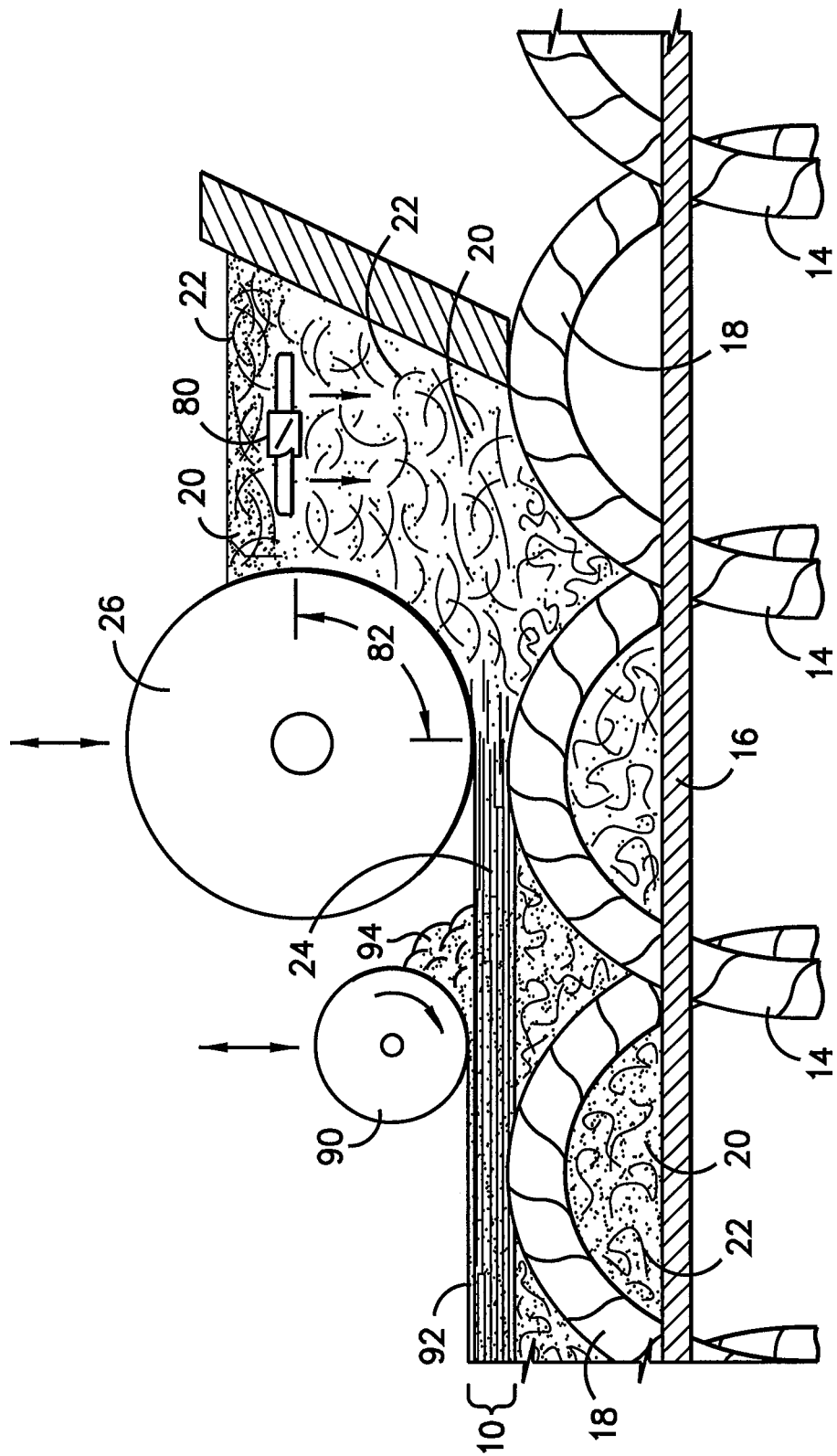
FIG. -9-

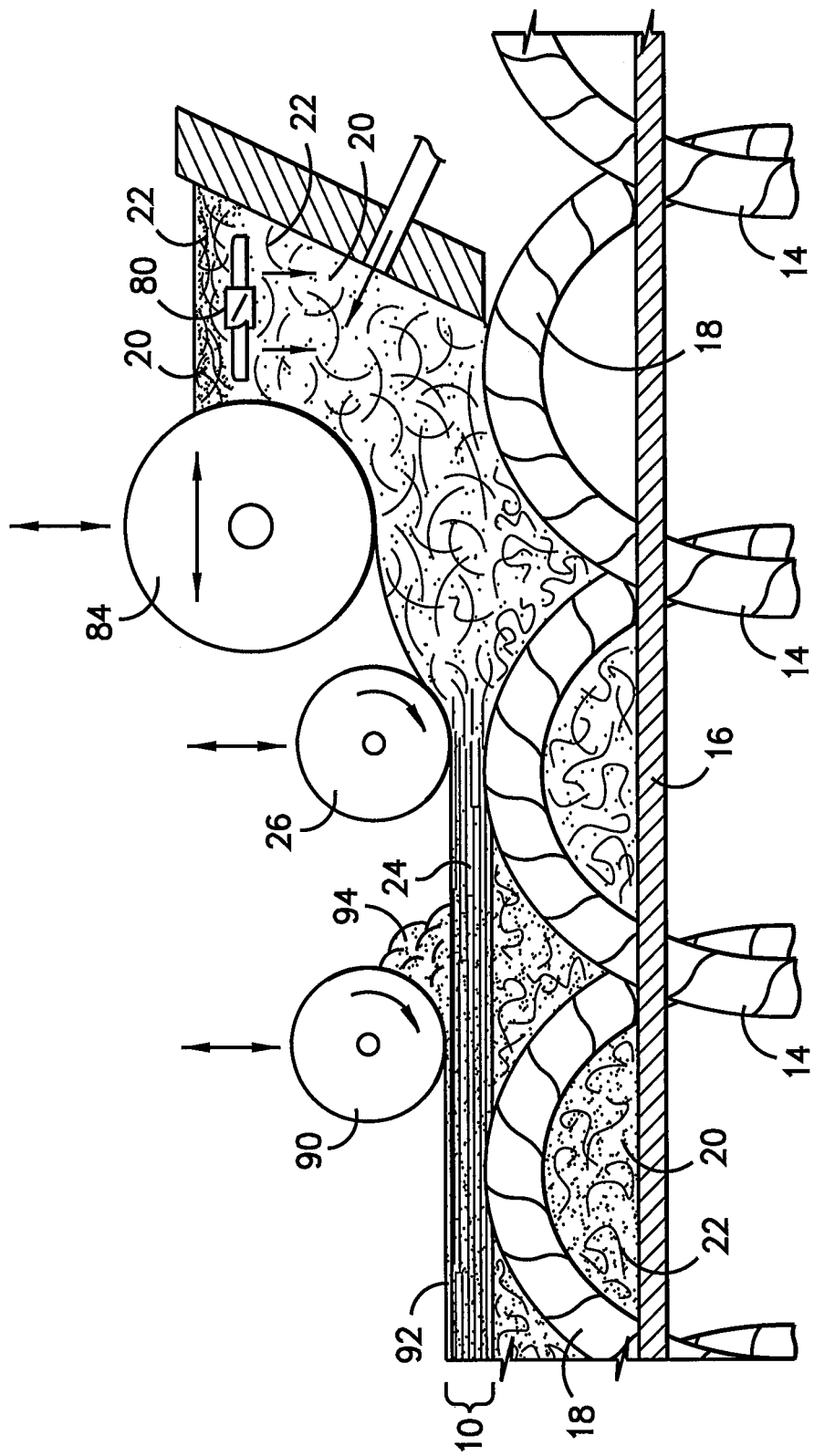
FIG. -10-

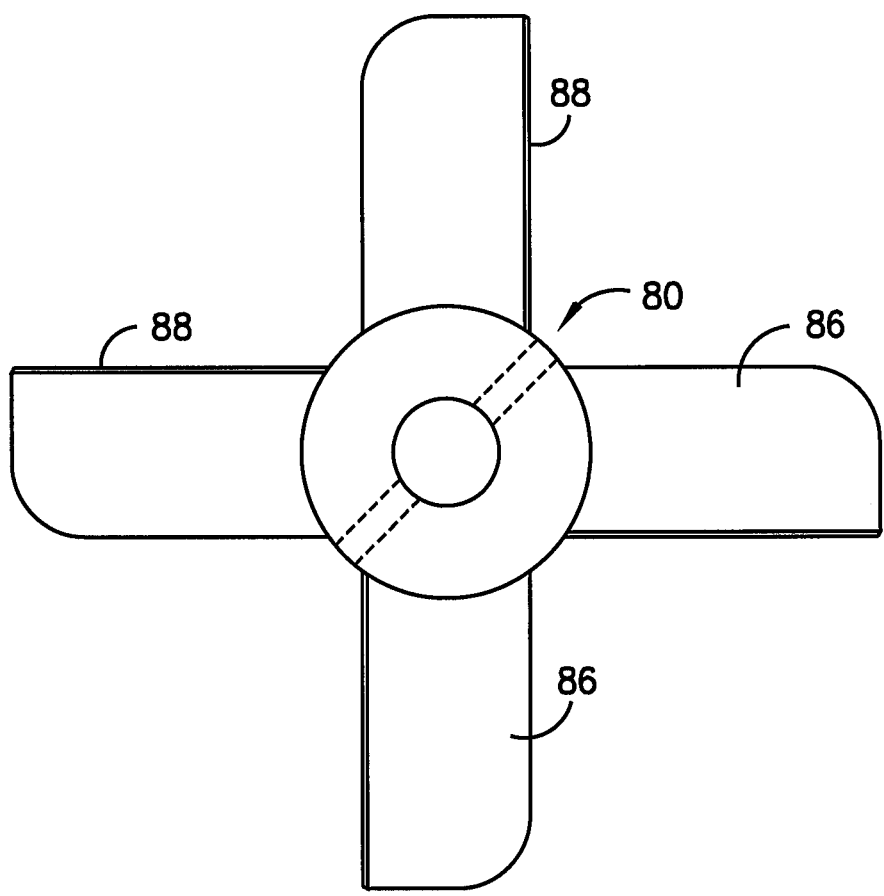
FIG. -11-

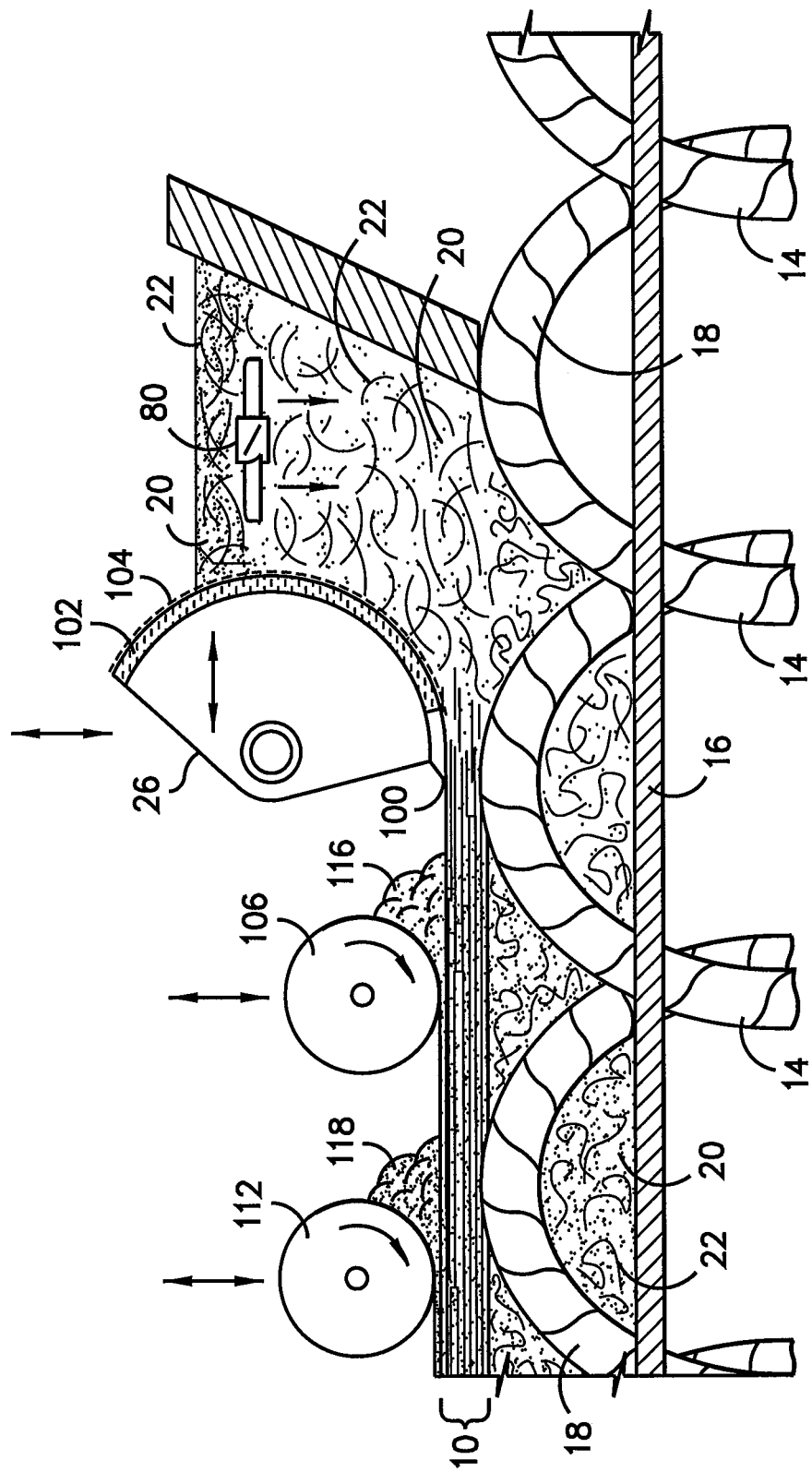
FIG. -12-

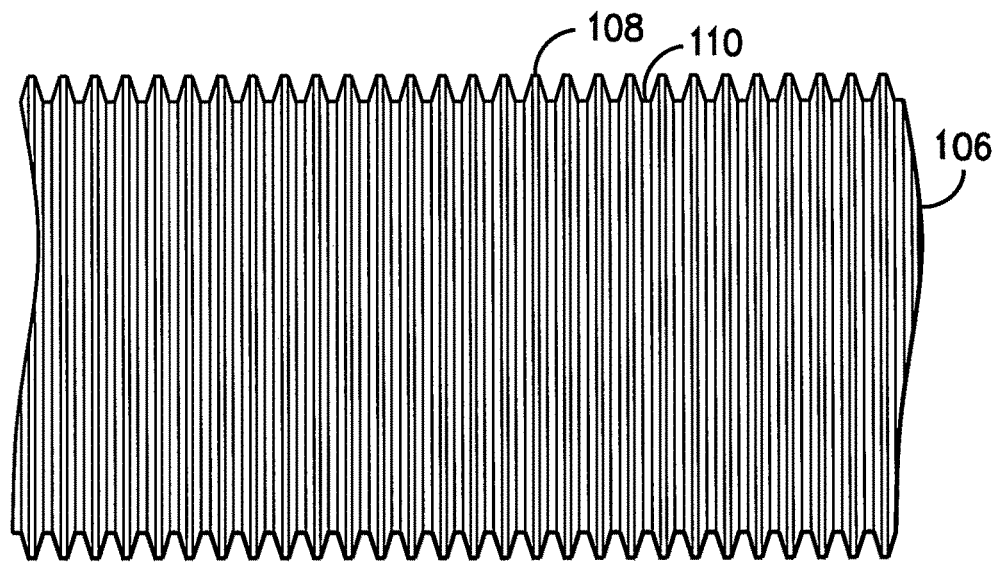
FIG. -13-
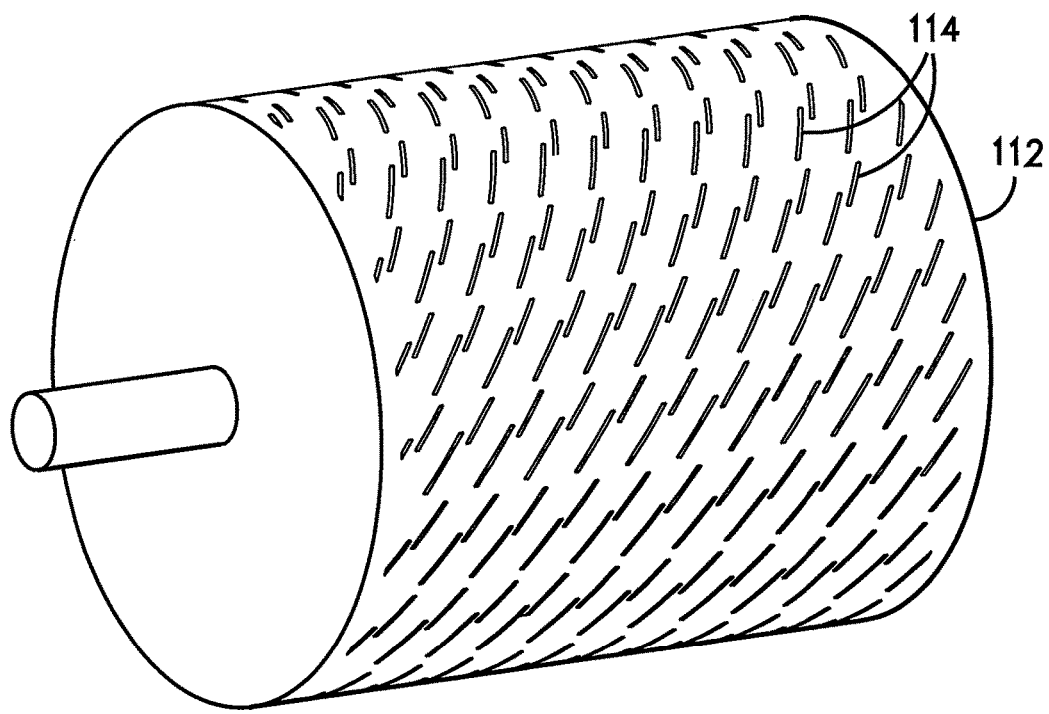
FIG. -14-

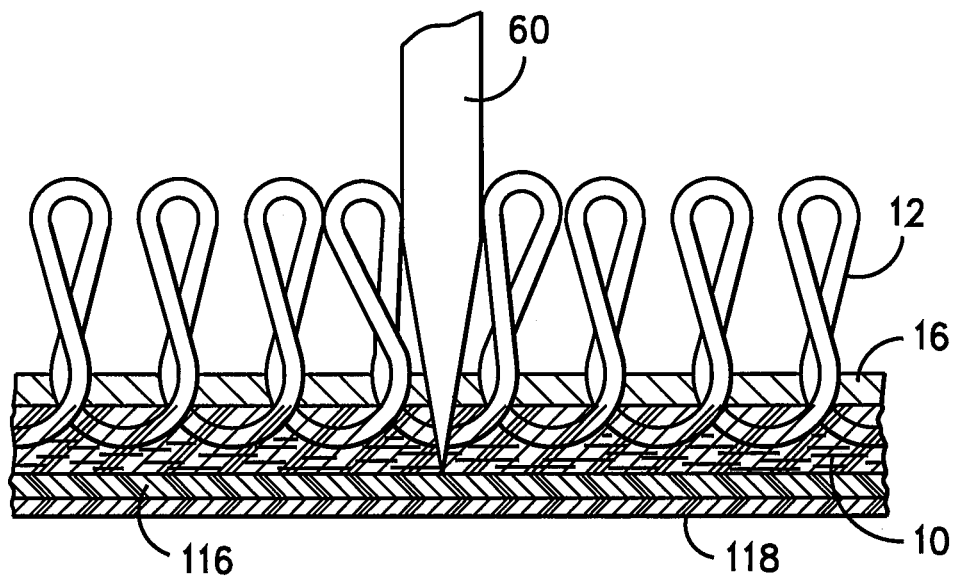
FIG. -15-
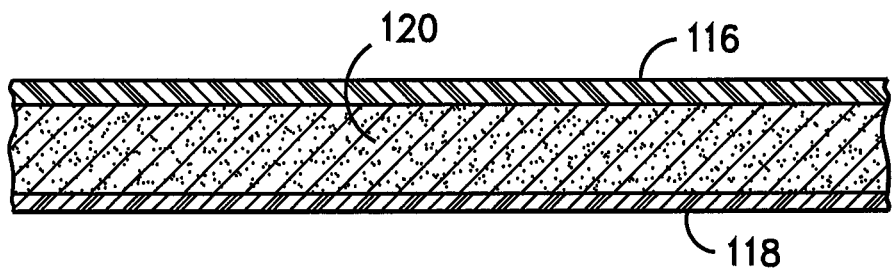
FIG. -16-

FLOOR COVERING WITH UNIVERSAL BACKING AND METHODS OF MAKING AND RECYCLING

CROSS REFERENCE TO RELATED APPLICATIONS

The present application is a continuation-in-part of U.S. application Ser. No. 15/879,520 filed Jan. 25, 2018, now U.S. Pat. No. 10,132,019, which is a continuation-in-part of U.S. application Ser. No. 15/607,789 filed May 30, 2017, now U.S. Pat. No. 9,924,820, which is a continuation-in-part of U.S. application Ser. No. 15/372,465 filed Dec. 8, 2016, now U.S. Pat. No. 9,775,457, which is a continuation in part of U.S. application Ser. No. 15/155,348 filed May 16, 2016, now U.S. Pat. No. 9,681,768, which is a continuation-in-part of U.S. application Ser. No. 15/098,509 filed Apr. 14, 2016, now U.S. Pat. No. 9,506,175, which is a continuation of U.S. application Ser. No. 14/090,190 filed Nov. 26, 2013, now U.S. Pat. No. 9,339,136, which claims priority to U.S. Provisional Application No. 61/797,496 filed Dec. 10, 2012, the disclosures of which are incorporated by reference herein in their entirety.

TECHNICAL FIELD

The present disclosure is directed to the field of textile floor coverings, such as broadloom carpet and modular carpet tiles, and particularly to a universal textile floor covering with a fiber-reinforced polymer backing. More particularly, according to one or more aspects provided herein, the present disclosure is directed to a floor covering including a tufted textile substrate and a universal backing system and to methods of making, installing, and recycling such a floor covering.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent the primary backing substrate. On the face side, a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of up to sixteen feet are possible with this equipment, and when sold at these widths, these carpets are referred to in the industry as "broadloom" carpets. This type of carpet is the preferred flooring material for today's residential homes and commercial buildings.

Modular carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced challenges and issues with stability. Without a separate reinforced floor covering and/or one or more secondary backing layers, the broadloom carpet design has the tendency to "creep" leading to undesirable growth. Modular tiles with their heavy backing layers are stiff. As a result, there is a tendency for the modular tiles to cup or curl. Other challenges for modular tiles and broadlooms occur because of issues relating to thickness and weight variation.

In today's carpeting designs, it is practically impossible to separate and recycle the different chemical compositions and components of the multiple backing layers, and preformed reinforcement layers, from the yarns because of the bonding and use of multiple layers being made of disparate materials. In addition, the manufacturers of floor coverings have significant material costs and expensive manufacturing or processing steps relating to the multiple backing layers, preformed reinforcement layers, and the disparate materials.

With respect to stability, it is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates tend to experience more shrinkage in the machine direction of the floor covering. Thus, the machine direction is almost always the more unstable direction of the floor covering.

There has been a need for a dimensionally stable floor covering of lower cost which may be used as a broadloom product or any variety of modular products. While the related patent applications referred to previously disclose a novel and unique universal carpet having a reinforcing backing layer, distinct and advantageous innovations and discoveries enhancing and improving the universal carpet invention will be disclosed and claimed herein.

SUMMARY

The related patent applications are directed primarily to a dimensionally stable floor covering with a universal fiber-reinforced backing. The floor covering may be used in broadloom products or any of a variety of modular products. The manufacturing methods and resulting products include a tufted textile substrate having a primary backing substrate and a plurality of yarns tufted through the primary backing substrate. The primary backing substrate includes a face side and a back side opposite the face side and a portion of each yarn forming a stitch located on the back side of the primary backing substrate.

The preferred manufacturing method and resulting product includes forming a wet-laid, overlapping, and laminated reinforcement layer of fibers that is substantially parallel to the machine direction thereby providing dimensional stability to the floor covering. This preferred manufacturing method and product also provides other advantages including permitting the same primary backing substrate to be used for all types of floor covering products thereby simplifying the manufacturing processes and reducing costs by eliminating the current requirement for pre-formed reinforcement layers. The manufacturing methods of the present invention also include, for example, forming a layer of fibers and adhesive between the reinforcement layer of fibers and the primary backing substrate or forming only a single layer of fibers and adhesive that is located in and between the stitches.

In the preferred manufacturing method, pressure is applied in a controlled manner between an applicator and the tufted textile substrate to move an adhesive and reinforcement fiber composition in a direction that is toward the back side of the primary backing substrate. During the application of controlled pressure against the fiber and adhesive composition and the movement of the tufted textile substrate in the machine direction, fibers are aligned to lay predominately in the machine direction. The preferred manufacturing method includes filtration of adhesive and reinforcement fibers such that adhesive is separated from reinforcement fibers, i.e., adhesive is pushed into the interstitial spaces between the yarns, and fibers are separated from adhesive. A wet-laid, overlapping, and laminated reinforcement layer of fibers is formed that is substantially parallel to the direction of movement of the tufted textile substrate thereby providing dimensional stability for the entire floor covering. In alternative and related versions of the preferred manufacturing method, a strengthening layer of fibers and adhesive is formed between the reinforcement layer of fibers and the primary backing substrate, or a single strengthening layer of fibers and adhesive is formed against the primary backing substrate, or a layer of fibers and adhesive is formed from the primary backing substrate to a surface that is spaced from the ends of the stitches.

The inventions as disclosed previously and herein also include, but are not limited to, the following:

a. a selection method for the tufting yarn, primary backing substrate, reinforcement fibers, and adhesive for providing the desired performance characteristics to be exhibited by the universal broadloom and modular carpeting;

b. a selection method of the equipment arrangement for applying adhesive and reinforcement fibers to a tufted textile substrate;

c. conditioning the adhesive and fibers by selective mixing of the reinforcement fibers in the adhesive and/or injection of compressed air into the adhesive and reinforcement fibers to assist in preparing the adhesive and reinforcement fiber composition to be in the preferred and desired condition and location;

d. selective use of a vacuum, pressure controller, and/or releasing applicator to insure the desired movement of the adhesive and/or fibers, including, for example, movement of adhesive into the bodies of the stitch portions of the yarns or into the back side of the primary backing substrate, or, for example, movement of fibers and adhesive into the spaces between the stitch portions before or during the time the applicator applies pressure to the tufted textile substrate, or, for example, providing a lubricated, slip path between the applicator and mixture of adhesive and fibers for separating the adhesive and fibers from the applicator and causing the mixture of adhesive and fibers to be directed toward the ends of the stitches;

e. selective use, movement, and configuration of an applicator arrangement to achieve the desired characteristics and design for the universal carpeting;

f. control of the pressure applied by the applicator and speed of movement by the tufted textile substrate to produce the desired universal carpet for either broadloom or modular products;

g. controlled cutting of the universal broadloom and modular carpeting in a roll for transporting and installation;

h. recycling the universal carpeting, if necessary, such that tufted carpet components and reinforcement fibers remain; and i. using a releasable adhesive cover system having, in the preferred embodiment, gecko-like and non tack characteristics for providing additional stability in the machine direction and providing the releasable attachment of the carpeting to a support surface.

These and other features and advantages of the present invention will be better understood with reference to the following description and appended claims. The accompanying drawings, which constitute a part of the present specification, illustrate various embodiments of the invention and, together with the written description, serve to explain the principles of the inventive products and methods.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 1 is a schematic diagram of an equipment arrangement for applying an adhesive layer and reinforcing fibers to a tufted textile substrate, as may be used in the production of the inventive floor covering products described herein.

FIG. 2 is a partial perspective view of an applicator and movable tufted textile substrate operating to produce the inventive floor covering products described herein.

FIG. 3 is a cross sectional view of FIG. 2 illustrating the use of one or more vacuums and the mixing of the adhesive and reinforcement fiber composition.

FIG. 3A is a close up schematic diagram of a small cross sectional portion of the primary backing substrate, stitches, and fibers, after the use of the first vacuum in FIG. 3, wherein the vacuum operates at a high level of controlled vacuum for causing the movement of fibers and adhesive into the spaces between the stitch portions before or during the time that the applicator applies pressure toward the tufted textile substrate.

FIG. 3B is a close up schematic diagram of the small cross sectional portion of the primary backing substrate, stitches, fibers, and fiber reinforcement layer, after the use of the first vacuum at a high level of controlled vacuum and after applying pressure in a controlled manner between the applicator and the tufted textile substrate.

FIG. 4A is a close up schematic diagram of a small cross sectional portion of the primary backing substrate, stitches, and fiber reinforcement layer, after the use of the first vacuum in FIG. 3 and after applying pressure in a controlled manner between the applicator and the tufted textile substrate in FIG. 3.

FIG. 4B is a close up schematic diagram of a small cross sectional portion of the primary backing substrate, stitches, and fiber reinforcement layer, after the use of the second vacuum in FIG. 3 and after applying pressure in a controlled manner between the applicator and the tufted textile substrate in FIG. 3.

FIG. 5 is a cross sectional view of FIG. 2 illustrating the use of one or more vacuums and the injection of compressed air into the mixing of the adhesive and reinforcement fiber composition.

FIG. 6 is a schematic diagram of an equipment arrangement for applying an adhesive layer and reinforcing fibers to a tufted textile substrate, the use of a vacuum, and the injection of compressed air into the mixing of the adhesive and reinforcement fiber composition, as may be used in the production of the inventive floor covering products described herein.

FIG. 6A is a close-up schematic diagram of a small cross-sectional portion of the primary backing substrate, stitches, and fiber reinforcement layer, after the use of the vacuum in FIG. 6 and after applying pressure in a controlled manner between the applicator and the tufted textile substrate in FIG. 6.

FIG. 7 is a schematic diagram of one embodiment of the equipment arrangement for cutting and rolling the universal floor covering described herein.

FIG. 8A is a schematic diagram of another embodiment of the equipment arrangement for cutting and rolling the universal floor covering described herein.

FIG. 8B is a partial cross sectional diagram of the embodiment of the equipment arrangement for cutting and rolling the universal floor covering that is shown in FIG. 8A.

FIG. 9 is a schematic diagram illustrating an alternative embodiment which uses a pressure controller and applicator for forming a fiber reinforcement layer and a mixture of fibers and adhesive in the spaces between the stitch portions.

FIG. 10 is a schematic diagram illustrating another alternative embodiment which uses a pressure controller and applicator for forming a fiber reinforcement layer and a mixture of fibers and adhesive in the spaces between the stitch portions.

FIG. 11 is a top schematic view of an embodiment of the pressure controller disclosed in FIGS. 9 and 10.

FIG. 12 is a schematic diagram illustrating an embodiment of the present invention which includes a releasing applicator and an illustration of a method for forming a releasable adhesive cover having gecko-like and non tack characteristics which allow a releasable attachment of the carpet to a support surface.

FIG. 13 is a cross-sectional schematic view of an embodiment of the primary conditioning and leveling member that may be used in the method for forming a releasable adhesive cover having gecko-like and non tack characteristics.

FIG. 14 is a schematic view of a secondary conditioning member that may be used for forming a releasable adhesive cover.

FIG. 15 is a partial cross sectional diagram of an exemplary universal carpet having an embodiment of the releasable adhesive cover and an embodiment of an arrangement for cutting the universal carpet having a releasable adhesive cover.

FIG. 16 is a schematic view of another embodiment of a releaseable adhesive cover.

The cross-sectional views depicted in the FIGURES are views taken along the machine direction of the product (i.e. in the direction along which the carpet product is tufted and coated).

DETAILED DESCRIPTION

Reference will now be made in detail to embodiments of the inventive products and methods, one or more examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

FIG. 1 is a schematic diagram, in accordance with the present invention, of an arrangement for applying adhesive and reinforcing fibers to a tufted textile substrate to form a universal reinforcing backing layer 10. The reinforcing backing layer 10 is used for both broadloom and modular floor coverings. The floor covering illustrated in FIG. 1 includes a tufted textile substrate 12 made of yarns 14 that are tufted through a primary backing substrate 16 in a first direction. As is known, the primary backing substrate 16 and tufted textile substrate 12 have a face side and a back side that is opposite to the face side. The yarns 14 form stitches 18 on the back side of the primary backing substrate 16 and an interstitial space exists between each yarn 14. The reinforcing backing layer 10 contains an adhesive 20 and a plurality of fibers 22 encased by the adhesive 20 for producing a continuous fiber layer 24 on the back side of the tufted textile substrate 12.

The tufted textile substrate 12 is moved relative to an applicator 26 as schematically shown in FIG. 1. A composition, including a mixture of adhesive 20 and reinforcement fibers 22, is moved into a space between the stitches 18 and the applicator 26. Pressure is applied in a controlled manner between the applicator 26 and tufted textile substrate for moving the adhesive and fiber composition in a second direction that is toward the back side of the primary backing substrate 16.

During the controlled movement of the tufted textile substrate 12 in a first direction, i.e., the machine direction, and the controlled application of pressure by the applicator 26, the fibers 22 align with each other into a reinforcement layer of fibers 24 that is substantially parallel to the first or machine direction. Contemporaneous with the controlled movement of the substrate 12 and the application of pressure by applicator 26, an in situ filtration of the composition of adhesive and fibers occurs wherein the adhesive 20 is separated from the fibers 22 such that adhesive is directed into the interstitial spaces between the yarns 14. The fibers 22 are prevented from penetrating into the interstitial spaces and the fibers 22 are laminated together by adhesive to form a wet-laid continuous overlapping reinforcement layer 24 of fibers that is substantially parallel to the first direction. After curing, the reinforcement layer of fibers and separated adhesive provides dimensional stability to the entire floor covering.

FIG. 2 is a partial view of an arrangement for applying adhesive and reinforcement fibers to a tufted textile substrate to form a universal reinforcement backing that may be used for broadloom and modular floor coverings. The tufted textile substrate 12 is moved in a first or machine direction by a belt 28 (FIG. 3) such that the tufted textile substrate 12 comes in contact with a composition or mixture of adhesive 20 and reinforcement fibers 22 that are located within a housing 30.

In accordance with one aspect of the present invention and as shown in FIG. 3, a vacuum tube 32 is positioned to apply vacuum on the face side of the tufted textile substrate 12 and primary backing substrate 16 before applying pressure in a controlled manner between the applicator 26 and tufted textile substrate 12. The use of vacuum 32 assists in causing the adhesive and fiber composition to move in a direction that is toward the back side of the primary backing substrate 16. Application of a vacuum during movement of the textile substrate and before applying pressure with applicator 26 also assists in the alignment and positioning of the reinforcement fibers before the filtration of the fibers 22 from the adhesive 20. The application of vacuum before applying pressure also helps to hold the fibers securely relative to each other and the stitches 18 for preventing slippage of the fibers and for aiding in the formation of the non-woven reinforcement layer of fibers 24.

FIG. 3A is a close up view of a small cross sectional portion of the primary backing substrate 16, stitches 18, and fibers 22 when a high level of controlled vacuum is drawn through the vacuum tube 32 for causing the movement of fibers 22 into the spaces between the stitch portions 18 before the applicator 26 applies pressure toward the primary backing substrate 16. In certain carpeting specifications, it may be desirable to have strength from fibers in the spaces between the stitch portions that is complimentary to or independent of the reinforcement: layer of fibers 24 in the machine direction which alone, as described previously, provides dimensional stability to the entire floor covering.

Depending on the amount of vacuum and the operational positioning between the vacuum tube 32 and applicator 26, the amount of fibers 22 and the final movement locations of the fibers 22 in the spaces between the stitch portions 18 can be controlled to. for example, cause a layer of fibers to be formed to engage the primary backing substrate 16 if desired for additional strength. Thus, FIG. 3B is only one configuration of the fibers 22 that results depending on the amount and time of vacuum as well as the operational positioning of both the vacuum tube 32 and applicator 26.

FIG. 3B is a close up view of the primary backing substrate 16, stitches 18, fibers 22, and fiber reinforcement layer 24 after the use of a high level of controlled vacuum for causing the movement of fibers 22 into the spaces between the stitch portions 18 and also after applying pressure in a controlled manner between the applicator 26 and backing substrate 16. As shown in the embodiment of FIG. 3B, the fiber reinforcement layer 24 encapsulates fibers 22 and adhesive 20 within the spaces between the stitch portions 18. The amount of pressure and movement applied by applicator 26 toward the primary backing substrate 16 controls the position and orientation of fibers 22 in the spaces between stitch portions 18, The equipment and operational construction illustrated and described in connection with FIGS. 3A and 3B provides for independent and/or combined movement and location of fibers 22 and adhesive 20 into the spaces between the stitch portions and/or the formation of a fiber layer engaging the stitch portions.

The primary backing substrate 16 is porous and the yarns penetrate the backing substrate 16 to increase the porosity of the backing substrate. This porosity allows the vacuum on the face side of the backing substrate 16 to cause adhesive 20 to completely penetrate the space between the substrate 16 and the fiber layer 24, including penetration within the stitches 18. FIG. 4A shows the penetration of adhesive 20 into the space between the substrate 16 and fiber layer 24. It is also advantageous for the vacuum to be selectively controlled such that the primary backing substrate 16 receives a controlled amount of adhesive as well. For example, the vacuum can be controlled such that a polyester non-woven primary backing substrate may have within it, as a result of the vacuum, a layer of adhesive that is approximately 25% of the thickness of the backing substrate whereas a polypropylene woven primary backing substrate may have within it, as a result of the vacuum, a layer of adhesive that is approximately 5% of the thickness of the backing substrate. An adhesive layer being formed in the primary backing substrate 16 by the vacuum adds strength to the primary backing substrate 16 and bonds the yarns 14 together for improved quality.

Another vacuum tube 34 is illustrated in FIG. 3 for applying a vacuum on the face side of the tufted textile substrate 12 and primary backing substrate 16. The vacuum through tube 34 occurs after applying pressure in a controlled manner between the applicator 26 and the tufted textile substrate 12. After applying a vacuum through vacuum tube 32 and the controlled application of pressure by applicator 26, the fiber layer 24 is substantially devoid of adhesive except for the fibers that are encased with adhesive to laminate the reinforcement layer of fibers together. As shown in FIGS. 3, 4B, and 5, applying additional vacuum through tube 34 causes the formation of bond sites 36. The bond sites 36 allow for mechanical attachment and/or bonding with other layers of materials such as thermoplastics.

As shown in FIG. 3, a mixer 38 is positioned in the composition of adhesive 20 and reinforcement fibers 22 to provide mixing of the adhesive and fibers either before and/or during the application of a vacuum through tube 32. The mixing of the adhesive and fibers prevents flocculation of the reinforcement fibers 22 which allows the fibers 22 to be better positioned by the vacuum as previously described.

FIG. 5 illustrates another aspect of the present invention wherein a mixing chamber 40 is provided, which includes a mixer 42 that mixes the fibers 22 and adhesive 20 together with injected compressed air. The injection of compressed air into the adhesive/fiber mixture provides spaces between the individual fibers as they progress from the mixing chamber 40 and into housing 30 and thereafter into the space between the applicator 26 and stitch portions 18. The injection of air also prevents flocculation and assists in distributing the fibers in a more uniform formation of the reinforcement layer of fibers 24. Another advantage from the injection of air is the increase in viscosity of the adhesive which enhances the formation of the fibers as a layer during the previously described filtering process.

FIGS. 6 and 6A illustrate another embodiment of the present invention wherein the applicator 26 both contacts and applies pressure to the tufted textile substrate 12 and provides a vacuum which is directed through the primary backing substrate 16. The vacuum from the applicator 26 occurs at the same time the applicator 26 is applying controlled pressure toward the primary backing substrate 16. In this embodiment of the invention, the composition of adhesive 20 and fibers 22 is pushed or forced to move toward the back side of the primary backing substrate 16 as previously disclosed. Further, the fibers 22 are aligned to lay predominantly in the machine direction during the application of pressure by the applicator 26 and movement of the tufted textile substrate 12 for forming a layer of fibers 24 that is substantially parallel to the machine direction. Moreover, in situ filtration of the adhesive/fiber composition occurs such that adhesive is pulled by the vacuum into the space between the primary backing substrate 16 and stitch portions 18.

While the carpet is moving relative to the applicator 26 in FIG. 6, a thin layer 44 (FIG. 6A) of adhesive forms on the reinforcement layer of fibers 24. Because of the configuration of the applicator 26 and vacuum, as shown in FIG. 6, and the position of engagement of the applicator 26 with the yarns 14, a reinforcement layer of fibers 24 is formed which is engaged on one side by the stitch portions 18 as previously disclosed. In addition, a thin layer 44 of only adhesive is formed on the opposite side of the reinforcement layer of fibers 24 as shown in FIG. 6A. The thin layer 44 of adhesive prevents the need to cover the otherwise exposed surface of the reinforcement layer 24 with any other type of adhesive such as polyethylene, PVC, or foam.

In the embodiment of the invention in FIG. 1, the applicator 26 is in engagement with the pool of adhesive 20 and fibers 22, whereas in the embodiment of the invention in FIG. 6-6A, the applicator 26 is only in engagement with the yarns 14. Both embodiments move the tufted textile substrate 12 relative to the applicator 26 and provide a space between the stitch portions 18 and the applicator 26; both embodiments provide a pool of adhesive 20 and fibers 22; both embodiments apply pressure in a controlled manner between the applicator 26 and tufted textile substrate 12 for pushing the adhesive 20 and fibers 22 toward the back side of the primary backing substrate 16; both embodiments align the fibers 22 to lay predominantly in the machine direction during the application of pressure and movement of the tufted textile substrate 12 such that the fibers 22 are aligned to be substantially parallel to the machine direction; and both embodiments provide in situ filtration of the adhesive/ fiber composition for pushing the adhesive away from the reinforcement fibers and for pushing adhesive into the interstitial spaces between the yarns 14. Both embodiments of the invention also provide a vacuum to move adhesive into the stitch portions of the yarns and into the back side of the primary backing substrate to provide enhanced dimensional stability. Further, both embodiments provide mixing of the adhesive/fiber composition and/or injection of compressed air into the adhesive/fiber composition to assist in preparing the adhesive and fiber composition to be in the preferred condition before the application of pressure. While there are no differences in the functionality of the embodiments illustrated in FIG. 1 and FIGS. 6 and 6A, the physical arrangement difference for applicator 26 and the vacuum in FIG. 1, as compared to FIGS. 6-6A, results in the additional advantageous formation of the thin adhesive layer 44 which eliminates the possible need to cover the otherwise exposed surface of the reinforcement layer 24 after curing.

The vacuum applicator disclosed in FIG. 6 may also be used with only a pool of adhesive 20 that does not include fibers 22. When used in this fashion, the vacuum would be directed through the porous primary backing substrate 16 to cause adhesive 20 to penetrate the interstitial spaces between each yarn 14 as well as into the stitches 18. The vacuum may be controlled such that the primary backing substrate 16 also receives a controlled amount of adhesive as described previously. Thus, the applicator 26 in FIG. 6 is flexible such that it may be used with adhesive 20 alone or in combination with fibers 22.

As stated previously, in each of the embodiments of the invention, the applicator 26 applies sufficient pressure in a controlled manner to move the adhesive 20 and fiber 22 composition in a direction that is toward the back side of the primary backing substrate 16. The amount of pressure or compression that is applied by the applicator 26 depends on the configuration of the applicator 26, the line speed of the reinforcing backing layer 10, the viscosity of the adhesive 20, and the diameter/weight of the fibers 22. The applicator pressure is sufficient to move the adhesive 20 into the interstitial spaces between each yarn 14 and, if desired, into the stitches 18 on the backside of the primary backing substrate 16, as shown in FIGS. 4A, 4B, and 6A. The amount of pressure or compression that is applied by the applicator 26 is also sufficient to remove the adhesive 20 from the fiber layer 24 except for that needed to provide lamination of the fiber layer 24. FIGS. 3 and 5 as well as FIG. 6 illustrate applicator 26 constructions for controlling the applicator pressure such that it is sufficient to move the adhesive 20 into the interstitial spaces between each yarn 14 and into the stitches 18. In FIGS. 3 and 5, the pivotal applicator 26 has a crescent or partial circle shape on one end and counter weights (not shown) on the other end. The counter weights can be removed or added depending on the amount of pressure that is applied by the applicator 26 to control the movement of the adhesive 20 and fiber 22 composition in the direction toward the back side of the backing substrate 16. FIG. 6 illustrates an applicator 26, that also includes vacuum, such that the applicator applies controlled pressure and the vacuum assists in the formation of layer 44 (FIG. 6A) as previously described.

The embodiments of the floor covering disclosed in FIGS. 1-6A may be recycled such that only the cleaned tufted carpet and loose reinforcement fibers remain. A floor covering made in accordance with the invention may be conveyed through a steam chamber in which the floor covering is exposed to steam for dissolving the adhesive composition. This will allow the tufted carpet, reinforcement fibers, and adhesive to be separated from each other and recycled.

FIGS. 7, 8A, and 8B illustrate two embodiments of the equipment arrangement for cutting and rolling the universal floor covering 50 described previously. Referring to the first embodiment In FIG. 7, the universal floor covering 50, including tufted textile substrate 12 and backing layer 10, is periodically and selectively cut by a locking pattern cutting roll 52 for forming multiple locking patterns 54 at designed intervals along the length of the universal floor covering roll 56. For modular carpeting, the locking pattern 54 allows the modular carpeting to be placed onto a roll for shipping and installation as a continuous yet segmented modular carpet. Modular carpeting is currently cut with a stop and go motion and the individual modular squares are handled as individual units These modular units must be separately boxed and subsequently palletized for shipment and installation. The ability to roll modular carpeting, as a continuous yet segmented modular carpet, is a substantial benefit over the known modular carpeting process of cutting separate modular squares that are boxed for shipment and installation.

FIGS. 8A and 8B illustrate another embodiment of the equipment arrangement for cutting and rolling the universal floor covering 50. In this embodiment, the universal floor covering 50 is periodically cut by the cutting roll 58 that has a cutting blade 60 for making multiple cuts 62 along the length of the universal floor covering roll 56. As shown in FIG. 8B, the cutting blade 60 does not penetrate the backing layer 10. This embodiment, like the one shown in FIG. 7, allows the carpeting to be placed onto a roll for shipping and installation as a continuous yet segmented carpet.

The equipment and operational techniques provided by the example embodiments in FIGS. 7, 8A, and 8B are applicable to both the broadloom and modular universal carpeting of the present invention. The designed cutting and rolling of each roll of the universal floor covering 50, as described herein, allows for both broadloom and modular carpeting to be shipped on the same roll. With respect to modular carpeting, the illustrated cutting and rolling techniques insure a matched module being placed next to its manufacturing counterpart because the modules are not separated. The programming used for the designed cutting and rolling of the universal floor covering section may also be used for cutting and rolling any other layer that lies under the universal floor covering thereby insuring a size match between the universal section and the underlying layer.

The dimensionally stable floor covering disclosed herein possesses sufficient stability and flexibility to permit installation without the need for traditional stretching or the use of traditional permanent flooring attachments such as tack strips or adhesive. This simplifies the installation and reduces the time and cost required for installation. The universal floor covering disclosed herein may be provided with a layer such as a high coefficient of friction backing layer. Examples of a high coefficient of friction backing include acrylic or natural latex. With the present invention, it is only necessary to measure the floor covering to fit the dimension of the room in which the floor covering is to be installed and then lay the floor covering into the room.

As described previously with respect to FIGS. 7, 8A, and 8B, another layer, such as a cushion layer, can be programmably cut and rolled to match the designed cutting and rolling of the universal floor covering sections to ensure a size match between the universal carpet sections and the underlying layer. Alternatively, an additional layer, such as layer 44 in FIG. 6A, can be applied during the manufacturing process so that the universal floor covering already includes a cushion or friction layer before it is rolled. Thus, the dimensionally stable floor covering of the present invention substantially reduces the costs associated with manufacturing, shipping, and installation as compared to conventional floor coverings.

Based upon the foregoing description of the invention, certain manufacturing steps are needed to produce the desired dimensionally stable universal floor covering for a specific application. Since the floor covering disclosed herein may be used for all broadloom or modular products, the materials to be used for the tufting yarn 14, primary backing substrate 16, reinforcement fibers 22, and adhesive 20 are designed and selected by taking into account the desired characteristics for either the broadloom or modular carpeting that will be manufactured and installed. For example, the viscosity of adhesive 20 is selected to ensure the desired strength and amount of penetration into the primary backing substrate 16 as described previously. Further, the length and diameter of the fibers 22 are chosen depending on the desired strength of the floor covering. Moreover, the tufting yarn 14 is primarily chosen for aesthetics and durability as well as the porosity and strength of the tuft stitches 18. The primary backing substrate 16 is also chosen for strength and porosity depending on the amount of penetration of adhesive 20 that is desired in the primary backing substrate 16.

As described previously, there are no functional or component differences in the universal backing layer 10 formed from the embodiments illustrated in FIGS. 3, 4A, 4B, 6 and 6A. The physical arrangement difference for the applicator 26 and the vacuum in FIG. 3, as compared to FIGS. 6-6A, results in other differences such as, for example, the formation of an adhesive layer 44 (FIG. 6A) before curing which eliminates the need to cover reinforcement layer 24 after curing, or the flexibility of using applicator 26 in FIG. 6 with adhesive 20 alone or in combination with fibers 22. Thus, a step in manufacturing the desired dimensionally stable universal floor covering for a specific application involves the selection of either the manufacturing arrangement illustrated in FIGS. 3, 4A, and 4B or the manufacturing arrangement illustrated in FIGS. 6 and 6A.

The use of vacuum, mixing, and injection of compressed air have been described in FIGS. 3-6A to assist in preparing the adhesive 20 and fiber 22 composition to be in the preferred condition and position before the application of pressure to form the reinforcement layer 24. The vacuum is used to help move adhesive 20 into the stitches 18 as well as the spaces between the stitches 18. The vacuum may also be used to move adhesive 20 into the back side of the primary backing substrate 16 to a selected depth. The mixing of fibers 22 and adhesive 20 occurs before in situ filtration of the adhesive 20 and fibers 22. Further, compressed air may be injected into the adhesive/fiber composition to provide spaces between the fibers 22 before application of pressure to the composition. The selection of the conditioning steps is made after the desired characteristics of the floor covering are known and the manufacturing arrangement has been selected.

After pre-conditioning of the adhesive 20 and fiber 22 composition to be in the preferred condition and position, the applicator 26 is controlled to apply pressure toward the back side of the primary backing substrate 16. Because of the frictional difference between the smooth surface of the applicator 26 and the fibrous texture of the stitches 18, the fibers 22 have a greater attraction toward the stitches 18 rather than the applicator 26. The increasing pressure from the applicator 26 and decreasing gap between the applicator 26 and stitches 18 results in the fibers 22 lying predominately in the machine direction to form a reinforcement layer of fibers, and the adhesive 20 being pushed toward the back side of the primary backing substrate 16 to form a layer of adhesive. The application of pressure by the applicator 26 is controlled to provide the desired thickness of the reinforcement layer of fibers and to move adhesive into the stitches 18, the spaces between the stitches 18, and into the back side of the primary backing substrate 16 if desired.

Another embodiment of the invention is disclosed in FIGS. 9-11. In this embodiment, a rotatable, linearly movable, and selectively tiltable pressure controller 80 is provided to separate and disperse the fibers 22 within the adhesive 20, as shown in FIGS. 9 and 10. Controller 80 also moves the conditioned composition of adhesive 20 and dispersed fibers 22 both uniformly and continuously toward the gap between the applicator 26 and stitches 18; and toward the primary backing substrate 16; and toward the spaces between the stitches 18. The movement of the adhesive 20 and dispersed fibers 22 is generally at an acute angle relative to the gap between the applicator 26 and stitches 18 to allow for the contemporaneous or simultaneous arrival of the adhesive/fiber composition within the entire area or space between the applicator 26 and backing substrate 16. Further, as shown in FIG. 9, the applicator 26 has a relatively elongated, curved, and angled surface portion 82 that engages the dispersed fibers 22 and adhesive 20 to provide a vortex like force that acts on the mixture of adhesive and fibers during the movement of the backing substrate 16 in the machine direction. This vortex like force is in addition to the conditioning force that controller 80 provides for moving the adhesive 20 and dispersed fibers 22 toward the primary backing substrate 16. Moreover, the vortex like force assists in aligning the fibers 22 before they pass into the gap separating the applicator 26 and stitches 18.

The controller 80 also provides mixing or conditioning to the adhesive 20 and fibers 22 for helping to prevent flocculation of the fibers as they are moved, as described previously. In addition, as shown in FIG. 10, compressed air can be injected in the adhesive/fiber mixture to help maintain spaces between the individual fibers 22. The injection of air also causes frothing of the adhesive 20 for further assisting in the desired distribution of the fibers 22 before they reach the gap between the applicator 26 and stitches 18.

FIG. 10 illustrates an alternative to the embodiment shown in FIG. 9. As shown in FIG. 10, a movable pressure device 84 applies pressure to the fibers 22 and adhesive 20 after the fibers have been dispersed and separated by the rotatable controller 80. The pressure supplied by the movable pressure device 84 is comparable in function to the vortex like pressure described with respect to FIG. 9. The movable pressure device 84 acts as a functional alternative to the vortex like force caused by surface portion 82. The pressure applied by device 84 is also adjustable such that the primary backing substrate 16 may be penetrated with a controlled amount of adhesive 20 for improving the strength of the primary backing substrate 16. Further, the amount of pressure applied by device 84 can be controlled to cause fibers 22 to engage the primary backing substrate 16 for additional strength.

An embodiment of the rotatable and movable pressure controller 80 is shown in FIG. 11. The illustrated controller 80 includes one or more blade like sections 86 with each section having an edge 88 that includes a point at its end to prevent damage to the fibers 22. The thickness of each blade like section 86 is preferably less than the length of a fiber 22. The pressure controller 80 is sized and positioned to apply pressure to the entire pool of adhesive 20 and fibers 22 so that the fibers 22 are separated and dispersed within the adhesive 20 as shown in FIGS. 9 and 10. Depending on the size of the pool of adhesive 20 and fibers 22, it may be necessary to provide one or more pressure controllers 80 to separate and dispense the fibers 22 within adhesive 20.

As illustrated in FIGS. 9 and 10, pressure controller 80 is positioned and operated to move the adhesive 20 and dispersed fibers 22 into the spaces between the stitch portions 18 at the same time that the applicator 26 is applying pressure in a controlled manner for forcing adhesive 20 and fibers 22 toward the back side of the primary backing substrate 16. This allows for the contemporaneous or simultaneous formation of the fiber reinforcement layer 24 and the formation of a mixture of fibers 22 and adhesive 20 in the spaces between the stitch portions 18. The end result of the just described contemporaneous or simultaneous formations is the same as using a vacuum tube 32 to form the end result shown in FIG. 3B. Another aspect and feature of the embodiment shown in FIGS. 9-11 is that the applicator 26 can be selectively moved into contact with the stitches 18 so that the adhesive 20 and fibers 22 only move into the spaces between the stitches 18. Thus, the embodiment disclosed in FIGS. 9-11 selectively provides for the movement and positioning of fibers 22 and adhesive 20 into the spaces between the stitch portions 18 or the formation of a fiber reinforcement layer 24 that captures fibers 22 and adhesive 20 within the spaces between the stitch portions 18.

FIGS. 9 and 10 also illustrate the use of a device 90 for forming a cushion or friction layer 92 that is made of a suitable material 94 such as a latex material or a thermoplastic material. After forming the reinforcement layer of fibers 24 as described previously, the desired cushion layer or friction layer 92 of material 94 is formed before or after curing. During the formation of layer 92 before curing, material 94 is forced into the reinforcement layer 24 by device 90 to thereby provide improved tensile strength and better lamination of the fibers 22. At the same time material 94 is forced into the reinforcement layer 24, layer 92 is formed at a desired thickness for providing a cushion layer or fiction layer for the carpeting. Alternatively, if applicator 26 is moved into contact with the stitches 18, as described previously, such that the reinforcement layer 24 is not formed or is too thin to provide significant reinforcement characteristics, device 90 may be moved toward the stitch portions 18 and material 94 may be applied to form a cushion or friction layer 92 that captures the fibers 22 and adhesive 20 that exist within the spaces between the stitch portions 18.

FIGS. 12-16 are related to and disclose another embodiment of the invention described in connection with FIGS. 9-11. Referring to FIG. 12, a crescent shaped, releasing applicator 26 includes a curved or angular engagement surface with a removable tip portion 100 on one end of the engagement surface. A fluid chamber portion 102 provides a slip path along the engagement surface, and the slip path is located between the releasing applicator 26 and the mixture of adhesive 20 and fibers 22. A separating or lubrication layer 104 is formed between the releasing applicator 26 and the moving mixture of adhesive 20 and fibers 22. Layer 104 separates the moving mixture of adhesive 20 and fibers 22 from frictional contact with the engagement surface of the crescent shaped applicator 26.

In the preferred embodiment of the releasing applicator 26, the engagement surface portion of the releasing applicator 26 is curved to provide a vortex like or tunnel force on the mixture of adhesive 20 and fibers 22. The vortex like or tunnel force provides directional force or pressure for the movement of the mixture of adhesive 20 and fibers 22.

The selectively pivotal applicator 26 and counter weights (not shown) provide variable and selective control of the pressure applied by applicator 26 which thereby selectively moves adhesive 20 and/or fibers 22 toward the primary backing substrate 16. Further, as described previously in connection with FIGS. 9 and 11, the controller 80 mixes and moves the composition of conditioned adhesive 20 and fibers 22 toward the gap between the applicator 26 and stitches 18 and toward the primary backing substrate 16. Moreover, applicator 26 provides a vortex like or tunnel force that acts on the mixture of adhesive and fibers with the vortex like force being in addition to the conditioning force that controller 80 provides.

The separating or slip layer 104 may be made by circulating cold water in fluid chamber 102 to form a layer of condensate along the entire engagement surface portion of the applicator 26. Alternatively, a lubricant may be discharged through the curved engagement wall of the fluid chamber 102 and along the entire engagement surface portion of the applicator 26 to form a liquid slip path between the applicator 26 and the mixture of adhesive 20 and fibers 22. The separating layer 104 provides a slip path for separating the treated mixture of adhesive 20 and fibers 22 from the applicator 26 so that the mixture may be more easily directed toward the stitches 18. Slip layer 104 may also be made by a layer of non-liquid slippery material to provide a slip path for separating the treated mixture of adhesive 20 and fibers 22 from the applicator 26.

As shown in FIG. 12, removable tip portion 100 is located on the exit end of the curved engagement surface of releasing applicator 26. The removable tip portion 100 may be planar, as shown in FIG. 12, or it may have other shapes depending on the desired characteristics for the movement of the adhesive 20 and/or the fibers 22 away from applicator 26. Tip portion 100 is angularly adjustable relative to the primary backing substrate 16 by, for example, the adjustable rotation or movement of releasing applicator 26. The combined use of the curved engagement surface of releasing applicator 26 and the shape and positioning of tip portion 100, assists in the application of a uniform pressure for obtaining the desired movement of the fibers 22 toward the primary backing substrate 16 and penetration of the adhesive 20 into the stitches 18. The removable tip 100 also provides assistance in preventing the formation of droplets in the adhesive 20.

The moving force and pressure that controller 80 provides to adhesive 20 and fibers 22 is enhanced by providing a slip layer 104. Further, the vortex like or tunnel force provided by the curved, crescent shaped, releasing applicator 26 is also enhanced by the formation of a lubricated slip path for the mixture of adhesive 20 and fibers 22. Moreover, the removable tip portion 100 is located on the end of the curved applicator engagement surface to enhance the penetration of the adhesive 20 and to compress the fibers 22 against the ends of the stitches 18. Applicator 26 is movable such that the positions of the crescent shaped applicator 26 and tip portion 100 may be selectively changed relative to the pool of adhesive 20 and fibers 22 for adjusting the amount of penetration of the adhesive 20 or for adjusting the amount of compression of the fibers 22 against the ends of the stitches 18.

FIGS. 12-16 also illustrate representative methods and apparatus for forming a releasable adhesive cover system for the universal carpeting. In the preferred embodiment, the releasable adhesive cover system has gecko-like and non-tack characteristics which provide advantages to the universal carpeting including the releasable attachment of the carpeting to a supporting surface and an improvement in the strength and stability of the universal carpeting. It is desirable to have a releasable, gecko-like cover system for the layer 24 (see e.g. FIG. 1, FIG. 3B, and FIG. 4A) of fibers 22, which is capable of adhering to a variety of surfaces while being releasable when desired. It is also desirable to improve the strength and stability of the universal carpeting in the machine direction by forming a cover for the relatively rigid layer 24 of fibers 22 wherein the cover engages and attaches to the reinforcement fiber layer for providing additional strength and stability to the universal carpeting.

As disclosed herein, the method for forming the releasable adhesive cover system includes using a primary conditioning member 106 for forming a conformed layer of adhesive 116, which is attached to the relatively rigid reinforcement fiber layer 24. The surface contact for the conformed layer of adhesive 116 is also maximized with a secondary conditioning member 112. It is preferred that a film layer of adhesive 118 be applied on the conformed layer of adhesive 116 after curing. The conformed layer of adhesive 116 and the film layer of adhesive 118 provide a releasable adhesive cover system, which also provides additional strength and stability and a breakable bond between the universal carpeting and the supporting surface.

After formation of the universal reinforcing backing layer 10 and before curing, a primary conditioning member 106 is used to conform the backing layer 10 by applying a conforming layer of water based adhesive 116 to the layer 24 of laminated fibers 22. As shown in FIG. 13, the primary conditioning member 106 includes peaks 108 and valleys 110. The peaks 108 engage the rigid layer of fibers and the valleys 110 disburse the water-based adhesive to form a level and conformed adhesive layer. Gecko-like characteristics result from the conforming layer that is provided by conditioning member 106 as well as the rigid base that is provided by the layer 24 of laminated fibers 22. Further, the engagement by the peaks 108 with the layer of fibers 24 also improves the lamination of the fibers 22 and the uniformity of the adhesive layer 116 (see FIG. 15). Moreover, by forcing the water based adhesive 116 into the layer of fibers 10 with conditioning member 106, there is an improvement in the surface strength and tensile strength of the fiber layer 24.

Referring again to FIG. 12, a secondary conditioning member 112 is provided to maximize surface contact. As shown in FIG. 14, the secondary conditioning member 112 includes embossing elements 114 that may extend outwardly or be recessed inwardly relative to the outer surface of member 112. The secondary conditioning provided by member 112 may occur before curing as illustrated in FIG. 12 or the secondary conditioning may occur after curing. The secondary conditioning member 112 may be used to form a film layer of water based adhesive 118 as shown in FIG. 12 and FIG. 15. It is preferable that secondary conditioning member 112 be used before curing and immediately after primary conditioning member 106 is used. It is also preferred that the layer of water based adhesive 118 be applied after curing by a different conditioning member. Moreover, it is preferable that the conformed layer of water based adhesive 116 be thicker than the relatively thin film layer of water based adhesive 118. The direct embossing of the conformed layer by secondary conditioning member 112 provides a desirable surface contact characteristic which is supplemental to the conforming characteristic provided by primary conditioning member 106.

As shown in FIG. 15, the film layer of water based adhesive 118 is attached to the conforming layer of water based adhesive 116. The two layers of adhesive 116 and 118 form a releasable or gecko-like cover for the reinforcing backing layer 10. The releasable cover may include both the layer of adhesive 116 and the layer of adhesive 118 or the cover may only include the layer of adhesive 116. While only exemplary and not limiting, both adhesive 116 and adhesive 118 are water based for permitting recycling and adhesive 116 includes a filler material such as calcium carbonate whereas adhesive 118 does not include a filler material. Alternatively, adhesive 116 or adhesive 118 may be non-synthetic, or a gecko-like pressure sensitive adhesive, or an adhesive having synthetic gecko-like setae which releasably attach to a support surface. The releasable or non tack, gecko-like cover is formed for backing layer 10 by using the methods and apparatus described previously, and the cover allows for the releasable attachment of the disclosed universal carpeting to a support surface. As used herein, a releasable cover system or a gecko-like cover system are each directed to a system having at least one adhesive that provides a releasable attachment of the carpeting and reinforcement fiber layer to a support surface.

The conformed layer 116 may be made from a water based, non-adhesive material. Similarly, the layer 118 may be made from a water-based material that is not a traditional adhesive material. However, conforming layer 116 and layer 118 should provide the conforming and gecko-like characteristics that will result in a releasable cover system. An example of a gecko-like releasable cover system is water based material forming a cover layer (e.g. layer 116) for the fiber and adhesive reinforcement layer, curing the cover layer to form a water based hardback layer, and securing a polyethylene film (e.g. layer 118) to a support surface for releasably attaching the cover layer to the film layer.

FIG. 16 discloses an alternative construction for the releasable cover that is attached to the reinforcing backing layer 10. A foam layer 120 is attached on one side to the layer of adhesive 116 and a layer of adhesive 118 is attached on the other side of the foam layer 120. Alternatively, one side of the foam layer 120 may be attached directly to the reinforcing backing layer 10 and either the layer of adhesive 116 or the layer of adhesive 118 is attached to the other side of the foam layer 120.

FIG. 15 also illustrates an embodiment of the equipment and approach for cutting and rolling the universal carpeting having the releasable cover that is disclosed in FIGS. 12-16. As shown in FIG. 15, the cutting blade 60 does not penetrate either of the cover layers having adhesive 116 or adhesive 118. Cutting blade 60 does cut through the primary backing substrate 16 and the reinforcing backing layer 10. Alternatively, the universal carpeting disclosed in FIG. 15 may be cut completely through or in accordance with one or more of the other embodiments for cutting disclosed in FIG. 7, 8A, or 8B. If layer 116 is attached to the reinforcing backing layer and layer 118 is separately attached to a support surface, it is preferred that the cutting blade 60 only cut through the primary backing substrate 16 and the reinforcing backing layer 10. This allows the layer 116 to bridge the seams between the cut pieces to releasably attach one cut piece to an adjacent cut piece.

The releasable or gecko-like cover system disclosed in FIGS. 12-16 receives desirable conforming and elasticity characteristics from primary conditioning member 106, a desirable relatively rigid base characteristic from fiber layer 24, and a high surface contact characteristic from secondary conditioning member 112. These characteristics allow the releasable or gecko-like adhesive cover system of the present invention to provide additional strength and stability in the machine direction and a releasable attachment of the carpeting to a support surface. It should also be understood that if, as an alternative embodiment, applicator 26 is moved near to or into engagement with the stitches 18 such that the fibers 22 and adhesive 20 are captured to form a relatively rigid layer of fiber and adhesive within the spaces between the stitch portions 18, the releasable or gecko-like cover system disclosed in FIGS. 12-16 can be made for the alternative embodiment using the method and apparatus described in connection with FIG. 12-16.

The manufacturing methods of the present invention include forming a relatively rigid layer of reinforcement fibers in the machine direction or forming a relatively rigid layer of fibers and adhesive between the reinforcement layer of fibers and the primary backing substrate. The manufacturing methods also include forming a relatively rigid reinforcement layer of fibers and adhesive that is located between the ends of the stitches and the primary backing substrate. In another embodiment of the invention, a relatively rigid reinforcement layer of fibers 22 and adhesive 20 is formed between the primary backing substrate 16 and a surface that is spaced away from the ends of the stitches 18, such as schematically shown in FIG. 3A. The applicator 26 is configured to be like the primary conditioning member 106 such that it has peaks 108 and valleys 110 (FIG. 13). In this embodiment, a pressure controller mixer 80 (FIG. 12) separates and disperses the fibers 22 within the adhesive 20. As is described in connection with FIG. 10, compressed air may be injected to help maintain spaces between the individual fibers 22. Further, a slip path, as described previously, may be provided to separate the moving mixture of adhesive and fibers from frictional contact with the peaks and valleys of the applicator 26. In this embodiment, the peaks and valleys of applicator 26 engage the pool of fibers and adhesive and assist in aligning the fibers in the machine direction. The peaks and valleys of applicator 26 also level the fibers and adhesive and form a level, conformed surface for the fibers and adhesive.

A water based cover may be applied to the level, conformed layer of adhesive and fibers before curing. After curing, the hardback cover, that is formed, may be attached to a support surface by a relatively slick sheet such as, for example, a polyethylene film. A dissolvable combination of the conformed layer of adhesive and fibers, the water based hardback cover, and the slick polyethylene film, creates a dissolvable gecko-like cover system that allows the carpeting to be releasably attached to a support surface. In another embodiment, the level, conformed layer of adhesive and fibers is cured, without applying a cover layer, and the cured layer of adhesive and fibers is attached to the relatively slick film on a support surface. In this embodiment, the conformed layer of adhesive and fibers and the slick polyethylene film create a gecko-like cover system for releasable attachment to a support surface.

The present invention may be embodied in other forms without departing from the spirit and the essential attributes thereof, and, accordingly, reference should be made to the appended claims, rather than to the foregoing specification, as indicative of the scope of the invention.

What is claimed is:

1. A method of manufacturing a universal floor covering which can be used as either a broadloom or modular floor covering, the method comprising the steps of:
    manufacturing either a broadloom or modular floor covering from a group of components including a tufted textile substrate having a primary backing substrate extending in a first direction and a plurality of yarns tufted through the primary backing substrate, the primary backing substrate having a face side and a back side opposite the face side, a portion of each yarn forming a stitch portion having an end that is located on the back side of the primary backing substrate, and spaces existing between the stitch portions;
    said group of components further including a composition pool having adhesive and reinforcement fibers;
    moving the tufted textile substrate relative to an applicator having an engagement surface, and providing space between the stitch portions of the yarns and the applicator;
    mixing the adhesive and reinforcement fibers to form a mixture of reinforcement fibers and adhesive;
    separating reinforcement fibers from each other during the mixing step;
    applying a moving pressure on the mixture of reinforcement fibers and adhesive to move reinforcement fibers and adhesive against the engagement surface of the applicator;
    forming a slip path on the engagement surface of the applicator for separating the reinforcement fibers and adhesive from frictional engagement with the applicator;
    applying controlled pressure with the applicator in a second direction towards the primary backing substrate and forming a relatively rigid reinforcement layer of reinforcement fibers and adhesive, the relatively rigid reinforcement layer of reinforcement fibers and adhesive providing strength and stability to the universal floor covering; and
    forming a releasable gecko-like cover system for providing a releasable attachment of the universal floor covering to a supporting surface.

2. The method of manufacturing a the universal floor covering according to claim 1 further comprising forming spaces between reinforcement fibers during the mixing step and aligning reinforcement fibers during the movement of the reinforcement fibers and adhesive against the engagement surface of the applicator.

3. The method of manufacturing a the universal floor covering according to claim 1 further comprising forming a conformed layer which is attached to the relatively rigid reinforcement layer of reinforcement fibers and adhesive.

4. The method of manufacturing the universal floor covering according to claim 3 further comprising forming a desirable surface contact characteristic with a conditioning member.

5. The method of manufacturing the universal floor covering according to claim 4 further comprising embossing the conformed layer with the conditioning member after the conformed layer is formed.

6. The method of manufacturing the universal floor covering according to claim 3 further comprising selectively cutting the universal floor covering without cutting through the conformed layer.

7. The method of manufacturing a the universal floor covering according to claim 1 further comprising forming a conformed layer consisting of the relatively rigid reinforcement layer of reinforcement fibers and adhesive.

8. The method of manufacturing the universal floor covering according to claim 3 or claim 7 further comprising attaching an adhesive layer to the conformed layer, and the adhesive layer and conformed layer providing the releasable gecko-like cover system for providing the releasable attachment of the universal floor covering to a supporting surface.

9. The method of manufacturing the universal floor covering according to claim 1, wherein the applicator comprises peaks and valleys, and the step of applying a moving pressure further comprises engaging the reinforcement fibers and adhesive with the peaks and valleys of the applicator to assist in aligning the reinforcement fibers in the first direction.

10. The method of manufacturing the universal floor covering according to claim 1 further comprising contemporaneously or simultaneously moving a portion of the mixture of adhesive and reinforcement fibers into the spaces between the stitch portions when forming the relatively rigid layer of reinforcement fibers and adhesive.

11. The method of manufacturing the universal floor covering according to claim 1, wherein the releasable gecko-like cover system is dissolvable.

* * * * *